(12) United States Patent
Larsson et al.

(10) Patent No.: US 11,988,455 B2
(45) Date of Patent: May 21, 2024

(54) THERMAL ENERGY STORAGE AND METHOD FOR CONSTRUCTING SUCH A THERMAL ENERGY STORAGE

(71) Applicant: Hydroc Energy Storage AB, Gothenburg (SE)

(72) Inventors: Sven-Åke Larsson, Gothenburg (SE); Bo Bergman, Gothenburg (SE); Nils Olofsson, Gothenburg (SE); Timo Pohjanvouri, Hovås (SE)

(73) Assignee: Hydroc Energy Storage AB, Gothenburg (SE)

( * ) Notice: Subject to any disclaimer, the term of this patent is extended or adjusted under 35 U.S.C. 154(b) by 0 days.

(21) Appl. No.: 18/023,641

(22) PCT Filed: Aug. 25, 2021

(86) PCT No.: PCT/SE2021/050823
§ 371 (c)(1),
(2) Date: Feb. 27, 2023

(87) PCT Pub. No.: WO2022/045950
PCT Pub. Date: Mar. 3, 2022

(65) Prior Publication Data
US 2023/0272982 A1    Aug. 31, 2023

(30) Foreign Application Priority Data

Aug. 28, 2020    (SE) .................................... 2050997-2

(51) Int. Cl.
*F28D 20/00*    (2006.01)
(52) U.S. Cl.
CPC ..... *F28D 20/0052* (2013.01); *F28D 20/0043* (2013.01); *F28D 2020/0069* (2013.01)

(58) Field of Classification Search
CPC ............. F28D 20/0052; F28D 20/0043; F28D 2020/0069
(Continued)

(56) References Cited

U.S. PATENT DOCUMENTS

| 4,223,729 A | 9/1980 | Foster |
| 4,505,322 A | 3/1985 | Larson |

(Continued)

FOREIGN PATENT DOCUMENTS

| BE | 884434 A | 11/1980 |
| CA | 3221904 A1 * | 12/2022 |

(Continued)

OTHER PUBLICATIONS

International Search Report and Written Opinion for PCT/SE2021/050823 that is the parent application to the instant application; Oct. 12, 2021; 12 pages.

(Continued)

*Primary Examiner* — Jon T. Schermerhorn, Jr.
(74) *Attorney, Agent, or Firm* — Harness, Dickey & Pierce, P.L.C.; Anthony G. Fussner

(57) ABSTRACT

The invention relates to a thermal energy storage with at least one thermal energy storage volume. The thermal energy storage comprises at least one primary borehole extending from ground level to a first predetermined depth in a rock body; at least one set of secondary boreholes located around the at least one primary borehole; and at least an upper and a lower fracture plane extending in a radial and/or oblique plane from the at least one primary borehole towards adjacent secondary boreholes. At least one fracture plane permits a hydraulic flow between at least one of the secondary boreholes and the primary borehole. Each thermal energy storage volume is defined by one set of secondary boreholes and its upper and lower fracture planes. The set of (Continued)

secondary boreholes diverge away from the at least one primary borehole at each fractured plane level, without intersecting the at least one primary borehole.

20 Claims, 11 Drawing Sheets

(58) Field of Classification Search
USPC .......................................................... 165/10
See application file for complete search history.

(56) References Cited

U.S. PATENT DOCUMENTS

| | | | |
|---|---|---|---|
| 7,213,651 B2 * | 5/2007 | Brannon | C09K 8/62 |
| | | | 166/177.5 |
| 7,753,122 B2 * | 7/2010 | Curlett | E21B 43/17 |
| | | | 166/305.1 |
| 8,763,387 B2 * | 7/2014 | Schmidt | F03D 9/255 |
| | | | 166/280.1 |
| 2007/0023163 A1 | 2/2007 | Kidwell et al. | |
| 2010/0272515 A1 * | 10/2010 | Curlett | F24T 10/20 |
| | | | 166/308.1 |
| 2010/0288465 A1 | 11/2010 | Stewart | |
| 2010/0307756 A1 | 12/2010 | Jung et al. | |
| 2015/0204171 A1 * | 7/2015 | Hocking | E21B 41/0085 |
| | | | 166/303 |
| 2015/0300327 A1 | 10/2015 | Sweatman et al. | |
| 2020/0217181 A1 | 7/2020 | Norbeck et al. | |

FOREIGN PATENT DOCUMENTS

| | | | | |
|---|---|---|---|---|
| CN | 107882535 A | | 4/2018 | |
| CN | 109611143 A | * | 4/2019 | .............. E21F 17/18 |
| CN | 110230960 A | * | 9/2019 | ........... E21B 43/263 |
| CN | 210370605 | | 4/2020 | |
| CN | 115012906 A | * | 9/2022 | |
| CN | 116025418 A | * | 4/2023 | |
| DE | 102008009499 A1 | * | 8/2009 | ............. E21B 43/17 |
| KR | 20180013355 A | | 2/2018 | |
| WO | WO-201513240 A1 | | 1/2015 | |
| WO | WO-2022260584 A1 | * | 12/2022 | |

OTHER PUBLICATIONS

Swedish Search Report; Swedish application No. 2050997-2 that is a parent application to the instant application; dated Mar. 24, 2021; 9 pages.
International Preliminary Report for PCT/SE2021/050823 that is the parent application to the instant application; dated Nov. 7, 2022; 17 pages.

* cited by examiner

THERMAL ENERGY STORAGE AND METHOD FOR CONSTRUCTING SUCH A THERMAL ENERGY STORAGE

This patent application is a U.S. national stage filing under 35 U.S.C. § 371 of PCT International Application No. PCT/SE2021/050823 filed Jul. 1, 2021 (published as WO2022/045950 on Mar. 3, 2022), which claims priority to and the benefit of Swedish Application No. SE2050997-2 filed Aug. 28, 2020. The entire contents of these applications are incorporated herein by reference.

TECHNICAL FIELD

The invention primarily relates to a thermal energy storage for storing energy in the form of heat in rock. More specifically, the invention relates to a method of storing heat from periods when excess energy is available to periods when it is desirable to recover the stored heat. The storage can work both as a short-term storage and as a long-term storage with annual variations. In one example, the heat storage is charged over a number of months during the summer and the accumulated heat can be discharged in cold periods during the winter. Alternatively, the thermal energy storage can be used for storing cold, wherein cold is stored during the winter for subsequent discharge during the summer for the purpose of cooling buildings etc. The invention likewise relates to a method for constructing such a heat storage.

BACKGROUND OF THE INVENTION

The need for energy storage in the form of heat or cold, has increased significantly over time, primarily called for by the development of alternative energy sources such as solar and wind energy but also for recovering excess and waste heat or cold from commercial and industrial facilities. Against this background, a number of systems have been proposed for accumulating energy in bodies of rock.

The need for energy storage primarily exists in areas with high energy consumption as urban, built up areas where they can be adapted for diurnal or seasonal energy usage, allowing heat or cold to be stored for later re-use. Suitable use for energy stored in this way includes control of the indoor environment in offices, shopping centres, hospitals and housing in general. Stored energy can be used for heating such public spaces in the winter and/or cooling them in the summer.

Thermal energy storage installations are especially well suited for urban areas as the distance between different buildings is relatively small, which facilitates distribution and equalization of thermal energy. Urban areas will also have a relatively high degree of existing networks for district heating/cooling, allowing for large-scale energy exchange between different types of buildings and properties.

Today, many proposed storage facilities are either small-scale facilities for local use or relatively large facilities involving comprehensive installation work and are intended for relatively large-scale installations where the high installation costs can be justified.

One type of small-scale installation involves drilling a number of vertical boreholes down to a permeable zone in the form of a hydraulically fractured crush zone or a natural aquifer. Hot water can then be pumped into the cavity for later use. This allows naturally occurring rock formations to be used or enhanced and the installation will not disturb local infrastructure as only a small number of holes are required. A problem with such installations is that they depend on local bedrock structure and have a limited capacity and are difficult to scale up.

Another small-scale system is shown in U.S. Pat. No. 4,445,499 and is based on storing solar heat in rock. The system involves drilling a plurality of holes situated close together down to a level of about 25 metres below the surface of the ground in the rock. These holes are lined with pipes or the like and are not connected by fracture planes. However, the cost of preparing all these holes is relatively high compared to the relatively small surface area and the limited capacity of such a small-scale system. Further a large-scale installation would require extensive drilling and a large ground level footprint.

SE429262 describes a larger installation for thermal energy storage. In this example, a storage for storing heat in rock is produced by fracturing the rock hydraulically in approximately plane parallel fissure planes from a number of boreholes. A number of production holes and infiltration boreholes are drilled down to the bottom of the cracked store. Hot water is supplied to the system from the infiltration boreholes, where after the water flows through the store along flow paths defined by the fractured planes and transverse channels towards one or more production holes. This type of facility has a relatively large capacity and provides a large surface area in relation to the number of holes drilled.

A problem with the above solutions is that they require a relatively large surfaces area at ground level, as well as a corresponding volume immediately below this surface area. Factors that characterize urban environments are high land prices as well as high environmental regulations and requirements both during construction and operation. At the same time urban environments will need relatively large energy storage facilities as energy consumption is high. Infrastructure projects of this type have a high value, which requires lead time for construction and the necessary investment to start operation needs to be minimized.

A further problem related to the bedrock beneath a built-up urban area. This bedrock has existing infrastructure that needs to be considered during construction, which infrastructure includes culverts, power cables, subways, utility and road tunnels, etc.

Finally, bedrock located at or near ground level must not be affected during construction or operation as this can have major economic consequences for adjacent infrastructure. For instance, when fracturing is used for creating or expanding an underground facility, a resulting heave at ground level can cause undesirable movement or damage to installations and structures above ground.

The solutions described above are therefore less suitable in urban areas, where the energy storage technology is most needed.

The object of the invention is to provide an improved thermal energy storage and a method for its construction that solves the above problems.

INVENTION

The above problems have been solved by a method as claimed in the appended claims.

In the subsequent text, the term "thermal energy storage" is intended to describe an arrangement allowing a liquid medium, usually in the form of hot or cold water, to be transferred from the surface into an underground storage facility in a rock body where the medium will heat or cool the rock body containing the thermal energy storage. Stored heat or cold can subsequently be transferred back to the surface by discharging the liquid medium from the thermal energy storage. The thermal energy storage is also referred to as a "storage". A thermal energy storage according to the invention can comprise one or more artificial thermal energy storage volumes, which will be referred to as "storage volumes" or "artificial storage volumes". In the text, the term "footprint" is used to define the topside surface area required for drilling the boreholes making up the at least one storage volume of the thermal energy storage. Each storage volume can comprise at least one production borehole, which will also be referred to as a "primary borehole". Further, infiltration holes associated with a production borehole will also be referred to as a "secondary boreholes".

According to one example, the invention relates to a thermal energy storage with at least one thermal energy storage volume. The thermal energy storage comprises at least one primary borehole extending from ground level to a first predetermined depth in a rock body, at least one set of secondary boreholes located in a cluster adjacent the at least one primary borehole at ground level. From ground level, the secondary boreholes are drilled past at least an upper and a lower fracture plane, which extend in a radial and/or oblique plane from the at least one primary borehole towards adjacent secondary boreholes. The secondary boreholes can be located in a cluster adjacent the primary borehole either around it in an equidistant or a more or less evenly distributed pattern, or in one or more clusters of two or more boreholes to at least one side of the primary borehole.

A primary borehole can extend downwards in a vertical direction, or at an acute angle to the vertical direction, relative to a horizontal plane at ground level. The angle of each primary borehole is selected dependent on factors such as local geological conditions, underground infrastructure, available drilling site position relative to a suitable rock body and/or the number and relative positions of individual planned storage volumes. For instance, the angle of a primary borehole can be adapted, but not limited to the local stress direction controlling fissure planes in the rock body in order to achieve fracture planes in a substantially radial direction from the primary borehole. As indicated above, fissure planes in a rock body can have an inclination of 20° but will usually not exceed 30° from a horizontal plane. When a vertical primary borehole is drilled through a rock body having angle fissure planes then the fracture planes will be located at a corresponding oblique angle to the primary borehole is drilled. This will result in an increased distance between the primary borehole and the secondary boreholes located on either side of the primary borehole in the direction of the incline. In order to maintain a desired flow, additional fracturing may be required. If desired, this can be avoided by drilling the primary borehole at angles adapted to the inclination of the fissure planes. In the latter case, the at least one primary borehole is drilled to a first predetermined depth that is preferably, but not necessarily, greater that the depth of the boreholes drilled for an adjacent set of secondary boreholes.

The primary borehole can comprise a single borehole or multiple boreholes. In the latter case, the primary boreholes can be concentric and extend to different depths wherein the borehole diameter decreases from an outer to an inner borehole. In this way, each such primary borehole can be provided for storage volumes or sections thereof located at different depths about the at least one primary borehole. The at least one primary borehole has a greater diameter than the adjacent set of secondary boreholes, as multiple secondary boreholes are provided to supply a substantially central primary borehole.

The set of secondary boreholes is drilled to diverge from the primary borehole(-s), at least between an upper fracture plane and a lower fracture plane, with increasing depth. The secondary boreholes and the upper and lower fracture planes can be said to define a fractured, artificial storage volume surrounding the at least one primary borehole.

However, the total or effective volume of a thermal energy storage will be larger than a storage volume defined in this way. This total volume is difficult to determine, as it extends outside the secondary boreholes and the upper and lower fracture planes defining a general outer boundary of a storage volume surrounding the at least one primary borehole. In the subsequent text, the term "storage volume" refers to an artificial thermal storage volume as defined above.

The total volume comprises the artificial storage volume where forced circulation of water occurs and an additional volume of the rock body surrounding the storage volume. The rock body making up the additional volume should be as dense and homogeneous as possible, such as an isotropic rock formation. Granite is a typical example of this type of rock formation. The additional volume surrounding the storage volume is heated or cooled by conduction from hot or cold water circulating through the storage volume and can provide a substantial addition to the capacity of the thermal energy storage. Also, the fracture planes will as a rule extend beyond the secondary boreholes and into the additional volume. The flow of water through the portions of the fracture planes extending past the secondary boreholes will be negligible compared to the total flow through the artificial storage volume, but it will contribute to the heating or cooling of the additional volume.

Each set of secondary boreholes comprises at least two drilled holes extending from ground level to a predetermined depth in the rock body and intersecting at least one fractured plane. Although a minimum of two drilled holes per set of secondary boreholes is possible within the scope of the invention, it is preferable to provide three or more secondary boreholes per set in order to create a more distinct storage volume about the at least one primary borehole. The use of three or more secondary boreholes per set will also allow the fracture planes to be utilized more effectively. The set of secondary boreholes can be located equidistant, or at least distributed around the at least one primary borehole at fractured plane level when possible. Variations in numbers and/or the distribution can be caused by a number of factors, such as fissure plane aperture distribution, fissure plane water flow pressure loss distribution, fissure plane radial distribution or by an active selection of the borehole position to enable a secondary borehole to reach a particular fracture plane or to avoid obstacles, such as local infrastructure or an undesirable rock formation. According to one example, the secondary boreholes can be arranged as generatrices along an approximate cone making up a storage volume. The apex of such an approximate cone is located above ground level, or alternatively below ground level as will be described below. The term "approximate cone" is used to describe a storage volume having a truncated, approximately conical shape with an imaginary apex, which approximate cone can have a substantially vertical axis or an axis at an acute angle relative to the vertical. A horizontal cross-section through the storage volume at any level coinciding with a fracture plane can have a substantially circular or oval shape, but is likely to have an irregular shape as a hydraulically fractured plane will follow fissures and weaknesses in the rock body.

Individual secondary boreholes within a set can be drilled at a desired drilling angle relative to the at least one primary borehole, but this angle is likely to vary from hole to hole. The desired drilling angle is selected together with the relative locations of the upper and lower fracture planes to achieve a storage volume having a desired size and heat storage capacity. In the case of a vertical primary borehole, a secondary borehole can diverge away from the primary borehole at angles up to 45° from the vertical direction at each fractured plane level. In cases where the at least one primary borehole extends downwards at an acute angle to the vertical direction, then the drilling angle of secondary boreholes located about the primary borehole between the upper and lower fracture planes is limited to an angle of 45° to the primary borehole. Variations in the drilling angle can be caused by a number of factors, such as geological conditions or by an active selection to enable a secondary borehole to reach a particular fracture plane.

Selecting secondary borehole drilling angles greater than 45° to the vertical primary borehole is possible, but the radial distance between the primary borehole and adjacent secondary boreholes increases rapidly with increasing depth at such angles. When the radius of a fracture plane increases then the flow is reduced, and the pressure drop increases. In order to compensate for this, increased fracturing may be required to achieve a larger aperture. This will in turn increase construction costs and the risk of disturbing infrastructure above the installation. For these reasons the drilling angle for the secondary boreholes are preferably limited to 45° from the vertical primary borehole. The depth is then limited by the maximum possible radius for a fracture plane intersecting the secondary boreholes.

In addition to the drilling angle described above, each secondary borehole can be arranged at an angle out of a radial plane through the least one primary borehole in order to pass to one side of the least one primary borehole between the upper fracture plane and ground level. Normally, a secondary borehole that is arranged as generatrix along an approximate cone making up a storage volume would be arranged at right angles to a tangent to the base of the approximate cone. In this example the secondary boreholes are instead arranged at an angle to a tangent to the base where the radial plane intersects the base. The angle can differ marginally from 90° and allows the secondary boreholes to pass a suitable minimum distance to one side of the primary borehole between the upper fracture plane and ground level. The angle is dependent on the required minimum distance between the primary and secondary boreholes, and on the total depth of the secondary borehole extending past an imaginary apex of the storage volume. This arrangement ensures that the secondary boreholes do not intersect the least one primary borehole at any point along its extension. The drilling angles of the secondary boreholes are measured relative to a vertical line at ground level instead of the primary borehole, as the secondary boreholes are arranged to reach ground level without having intersected the primary borehole at any point. In this example, example the apex of an imaginary approximated cone defined by the secondary boreholes is located below ground level. An advantage of this arrangement is that the storage volume will diverge further down below ground level compared to a storage volume as described in the above examples. This will for instance allow for larger drilling angles for the secondary boreholes without interfering with adjacent underground infrastructure.

As indicated above, each set of secondary boreholes is associated with a storage volume. The thermal energy storage can comprise two or more storage volumes located substantially concentrically about at least one central primary borehole at successively increasing depths. In this case, each set of secondary boreholes diverges from the at least one primary borehole at angles that are reduced with each successive thermal energy storage volume. Each successive storage volume comprises at least an upper and a lower fracture plane located so that each storage volume is separated from adjacent storage volumes in the vertical direction. The fracture planes permit a hydraulic flow between the secondary boreholes and the at least one primary borehole. The direction of the flow is dependent on whether the storage volume is being charged or discharged, which will be described in further detail below. Each storage volume within the thermal energy storage has a general outer boundary defined by one set of secondary boreholes and its associated upper and lower fracture planes.

As stated above, the set of secondary boreholes diverge away from the at least one primary borehole at each fractured plane level, without intersecting the at least one primary borehole. In this way, a relatively large storage volume can be achieved while the footprint of the thermal energy storage can be kept relatively small at ground level.

Each storage volume comprises at least an upper and a lower fracture plane, which can be combined with one or more intermediate fracture planes depending on the required dimensions of the storage volume. The general outer boundary of the storage volume is determined by the drilling angles of the secondary boreholes and the distance between the upper and lower fracture planes. The total volume of a storage volume to be heated or cooled during operation will be larger, as the fracture planes will as a rule extend beyond this general outline even though very little water will be circulated beyond the secondary boreholes. The total volume will further comprise a volume below the lower fracture plane which will be heated or cooled during operation of the thermal energy storage. This lower volume has a substantially conical shape and can store heat or cold even though it has no fracture planes and no water actively circulated through it. The above volumes which extend beyond the general outline of the storage volume is heated or cooled by the artificial storage volume through conduction.

The size of the storage volume, the number of fracture planes within each storage volume and the spacing between adjacent fracture planes is determined by considering a number of factors. A non-exhaustive list of such factors include the heat-conducting capacity of the rock, the cumulative aperture area of all fracture planes required for a desired flow and pressure, the total surface area of the fracture planes, the temperature of the water to be supplied during charging, the desired flow rate to be withdrawn during discharging, charging cycle time and the desired storage capacity of the thermal energy storage.

The desired heat transfer capacity of a storage volume is mainly dependent on the conductive properties of the rock body and on the cumulative surface area of all fracture planes. The surface area of each fracture plane is made up of all cracks and fissures extending both in radial directions from the primary borehole and in vertical directions out of the fracture plane. The desired the flow rate of a storage volume is mainly dependent on the cumulative aperture area and the radial extension of all fracture planes from the primary boreholes. Both the surface area and the aperture area of each fracture plane can to a large extent be controlled when performing hydraulic fracturing during construction of the thermal energy storage.

According to one example, the storage volumes making up the thermal energy storage can be constructed so that the cumulative aperture area of all fracture planes from the upper fracture plane to the lower fracture plane, measured adjacent the primary borehole, is distributed so that at least half the cumulative aperture area is located at or below a point half way between the upper and lower fracture planes. Also, or in addition, the size of each fracture plane aperture is selected based on a desired flow rate for each fracture plane. This arrangement will improve the flow of water through the storage volume and minimize the heave at or immediately below ground level at or near the drilling site.

According to a further example, the fracture plane apertures can be selected to increase from the upper fracture plane down towards the lower fracture plane. The rate of increase in fracture plane aperture need not necessarily be constant or in some steps be negative, but can be varied at regular or irregular steps, as long as the overall trend is increasing.

An effect of the above arrangement involving fracture plane distribution and aperture area distribution combined with the diverging secondary boreholes, is that the stress induced into the rock body above the upper fracture plane as the storage volume is fractured will cause little or no heave at surface level.

The invention further relates to a process for constructing a thermal energy storage with at least one artificial thermal energy storage volume. the process comprises the steps of:
drilling at least one primary borehole extending from ground level to a first predetermined depth in a rock body;
drilling at least one set of secondary boreholes located around and diverging at fractured plane level away from the at least one primary borehole without intersecting the at least one primary borehole;
hydraulically fracturing at least an upper and a lower fracture plane extending from the at least one primary borehole towards adjacent secondary boreholes, which fracture planes permit a hydraulic flow between the secondary boreholes and the primary borehole; which hydraulic fracturing step is performed before or after the drilling of secondary boreholes; and
wherein each artificial thermal energy storage volume has a general outer boundary defined by one set of secondary boreholes and its upper and lower fracture planes.

The process can involve drilling individual holes in the set of secondary boreholes in a thermal energy storage volume from ground level to the same depth or to individual depths in the rock body. The set of secondary boreholes are not required to extend to the same depth as the at least one primary borehole. The set of secondary boreholes can be located equidistant, or at least distributed around the at least one primary borehole at fractured plane level when possible. Variations in numbers and/or the distribution can be caused by a number of factors, such as geological conditions or by an active selection of the borehole position to enable a secondary borehole to reach a particular fracture plane or to avoid an undesirable rock formation.

The process further involves drilling the secondary boreholes so that they diverge away from the at least one primary borehole at angles up to 45° at each fractured plane level. The holes in each set secondary boreholes associated with a storage volume can preferably, but not necessarily, be kept within set drilling angle tolerances.

The at least one primary borehole can be drilled vertically downwards, or at an acute angle to the vertical. In the latter case, the primary borehole can be drilled at right angles to a local inclination of the fissure planes, which can have an inclination of 20° but will usually not exceed 30° from a horizontal plane. the process further involves hydraulically fracturing fracture planes along the extension of the at least one primary borehole. Depending on the main stress directions and the inclination of fissure planes in the rock body, hydraulically fractured fracture planes can extend in a radial and/or oblique plane from the at least one primary borehole, depending on the angle of the primary borehole relative to the inclination of fissure planes.

According to a further example, each secondary borehole can be drilled at an angle out of a radial plane through the least one primary borehole in order to pass to one side of the least one primary borehole. This ensures that the secondary boreholes do not intersect the least one primary borehole at any point along its extension before reaching ground level.

According to a further example, the process involves hydraulically fracturing fracture planes so that the cumulative aperture area of all fracture planes from the upper fracture plane to the lower fracture plane, measured adjacent the primary borehole, is distributed so that at least half the cumulative aperture area is located at or below a point half way between the upper and lower fracture planes. Also, or in addition, during fracturing the size of each fracture plane aperture is selected based on a desired flow rate for each fracture plane.

The process can further involve hydraulically fracturing fracture planes so that the fracture plane apertures increase from the upper fracture plane towards the lower fracture plane. The rate of increase in fracture plane aperture need not necessarily be constant or non-negative but can be varied at regular or irregular steps, as long as the overall trend is increasing.

As indicated above, the hydraulic fracturing step can be performed before or after the drilling of secondary boreholes. When hydraulic fracturing is performed before the secondary boreholes are drilled, then the pressure and flow will cause fissures in the rock to open up and the fracture plane to extend outwards from the pressurized section of primary borehole as far as can be achieved by the applied pressure. This allows the distribution and extent of a fracture plane to be monitored and mapped, which data can be used for optimal positioning of the secondary boreholes during subsequent drilling. Both the distribution and number of secondary boreholes, as well as their individual drilling angles can be adapted in view of the distribution and extent of the fracture planes within a storage volume.

When hydraulic fracturing is performed after the secondary boreholes are drilled, then the pressure will cause the fracture plane to extend outwards from the pressurized section of primary borehole and substantially up to the secondary boreholes. During drilling of the secondary boreholes, the local stress direction in the body of rock will be affected. During a subsequent hydraulic fracturing step, the extension of the fracture planes can be limited due to local changes in the stress direction. This allows for an intentional limitation in the extension of the fracture planes in a storage volume in cases when it is desirable to control and/or limit the distribution and extent of the fracture planes. This can be the case when multiple storage volumes are constructed side-by-side or when it is necessary to avoid fracturing in adjacent rock bodies containing existing structures.

According to the invention, the set of secondary boreholes diverge away from the at least one primary borehole at each fractured plane level with increasing depth. An advantage of this is that a relatively large storage volume can be achieved while the footprint of the thermal energy storage can be kept relatively small at ground level, which is a significant difference compared to state-of-the-art installations using vertical drilled holes. As a comparative example, the footprint of such a state-of-the-art installation can cover an area greater than a football field, while an installation according to the invention can be fitted within a tennis court. This is achieved by locating each set of secondary boreholes in a cluster adjacent the at least one primary borehole at ground level. The secondary boreholes can be located in a cluster adjacent the primary borehole either around it in an equidistant or a more or less evenly distributed pattern, or in one or more clusters of two or more boreholes to at least one side of the primary borehole at ground level.

A further advantage of the invention is that it allows thermal energy storage installations to be constructed while avoiding existing infrastructure during construction, which infrastructure includes culverts, power cables, subways, utility and road tunnels, etc. Due to the general shape of the storage volume or volumes, existing infrastructure can be bypassed and the storage volume itself is located below and separated from the infrastructure.

A further advantage of the invention is that the use of a primary borehole drilled at an angle to the vertical allows heave, or rock displacement at ground level, to be "positioned" during a subsequent fracturing operation. By selecting a suitable direction for a storage volume in the direction away from the drilling site, possible heave as a result of fracturing can be placed in a position where it will not disturb infrastructure at or below the surface.

A further advantage of the invention is that it allows relatively large thermal energy storage installations to be constructed while avoiding or at least minimizing heave at ground level. A state-of-the-art installation having a cylindrical or rectangular shape in plan view will cause heave at ground level over a surface substantially corresponding to its footprint. Heave at this scale makes such installations unsuitable in built-up areas, as adjacent buildings can be subjected to structural damage.

Further, the invention involves at least one storage volume comprising downwardly diverging secondary boreholes which can be combined with an inventive fracture plane distribution and aperture area distribution throughout the storage volume. An effect of this solution is that the stress induced into the rock body above the upper fracture plane as the storage volume is hydraulically fractured will cause little or no heave at surface level. During subsequent operation of the installation, expansion or contraction of the rock body caused by temperature variations in the rock body will not cause heave at ground level due to the inventive construction.

FIGURES

In the following text, the invention will be described in detail with reference to the attached drawings. These schematic drawings are used for illustration only and do not in any way limit the scope of the invention. In the drawings.

Figures 1A, 1B:
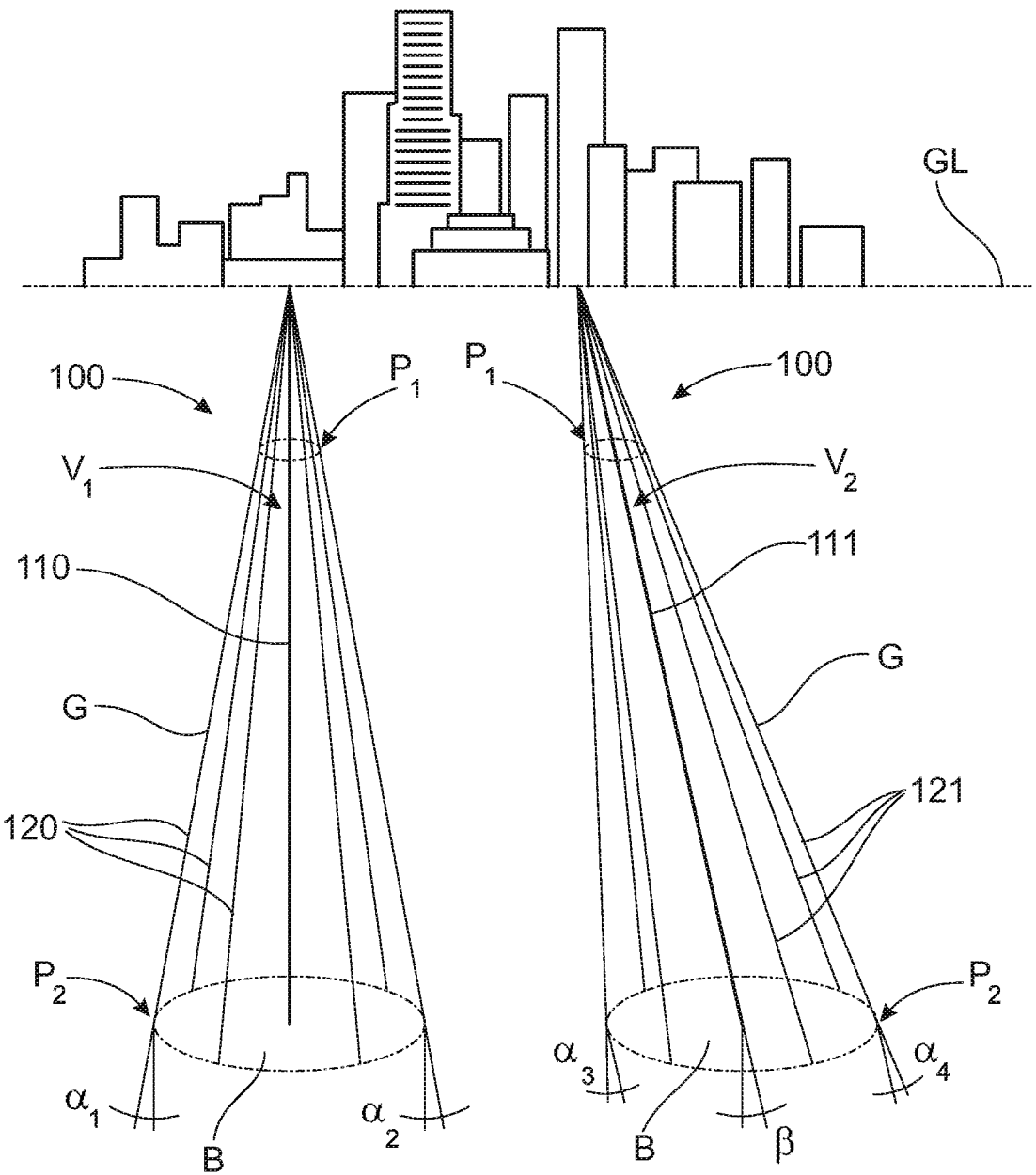
FIG. 1A shows a schematically indicated perspective view of a first example of a thermal energy storage according to the invention.
FIG. 1B shows a schematically indicated perspective view of a second example of a thermal energy storage according to the invention.
Figure 3A:
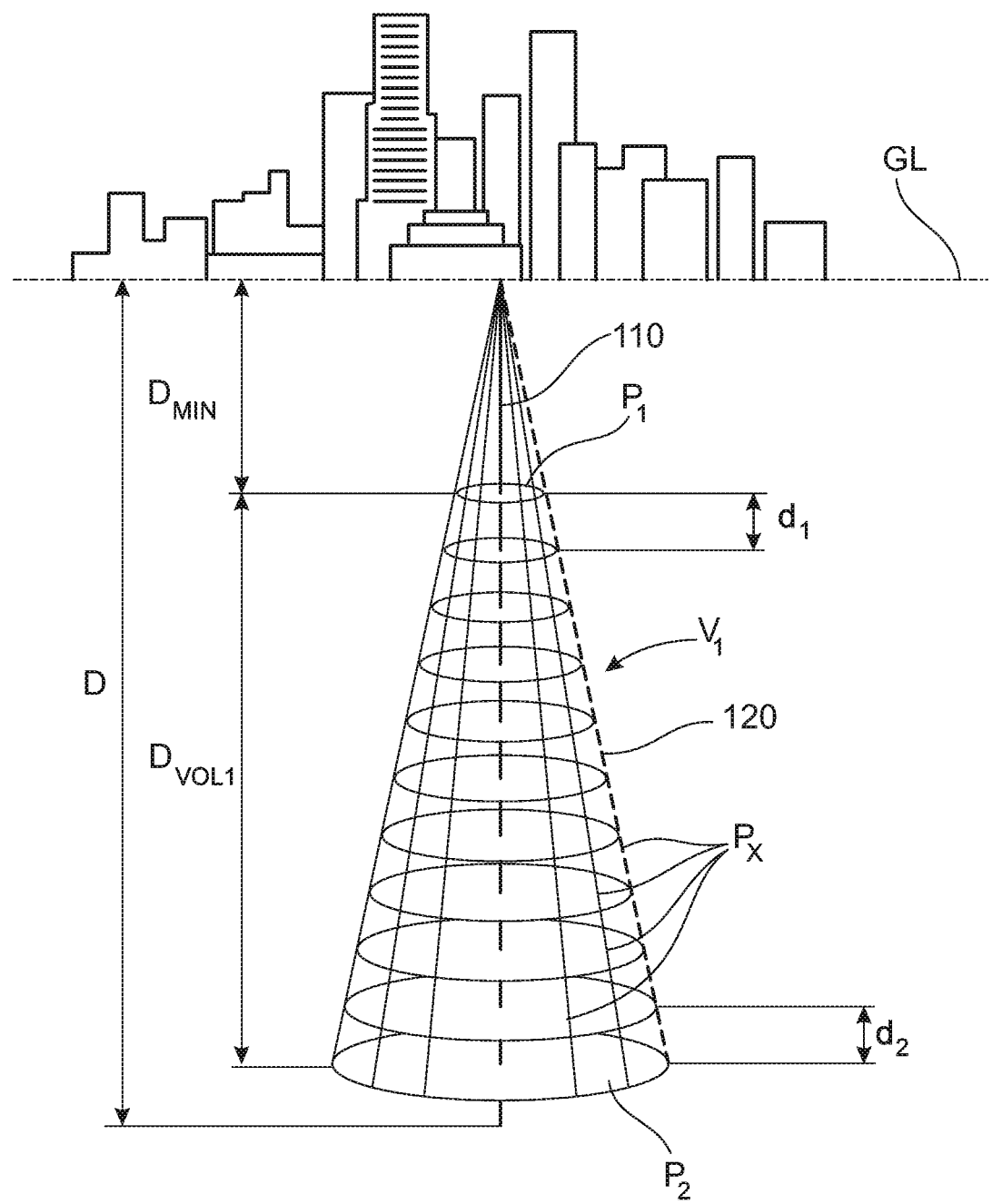
Figure 3B:
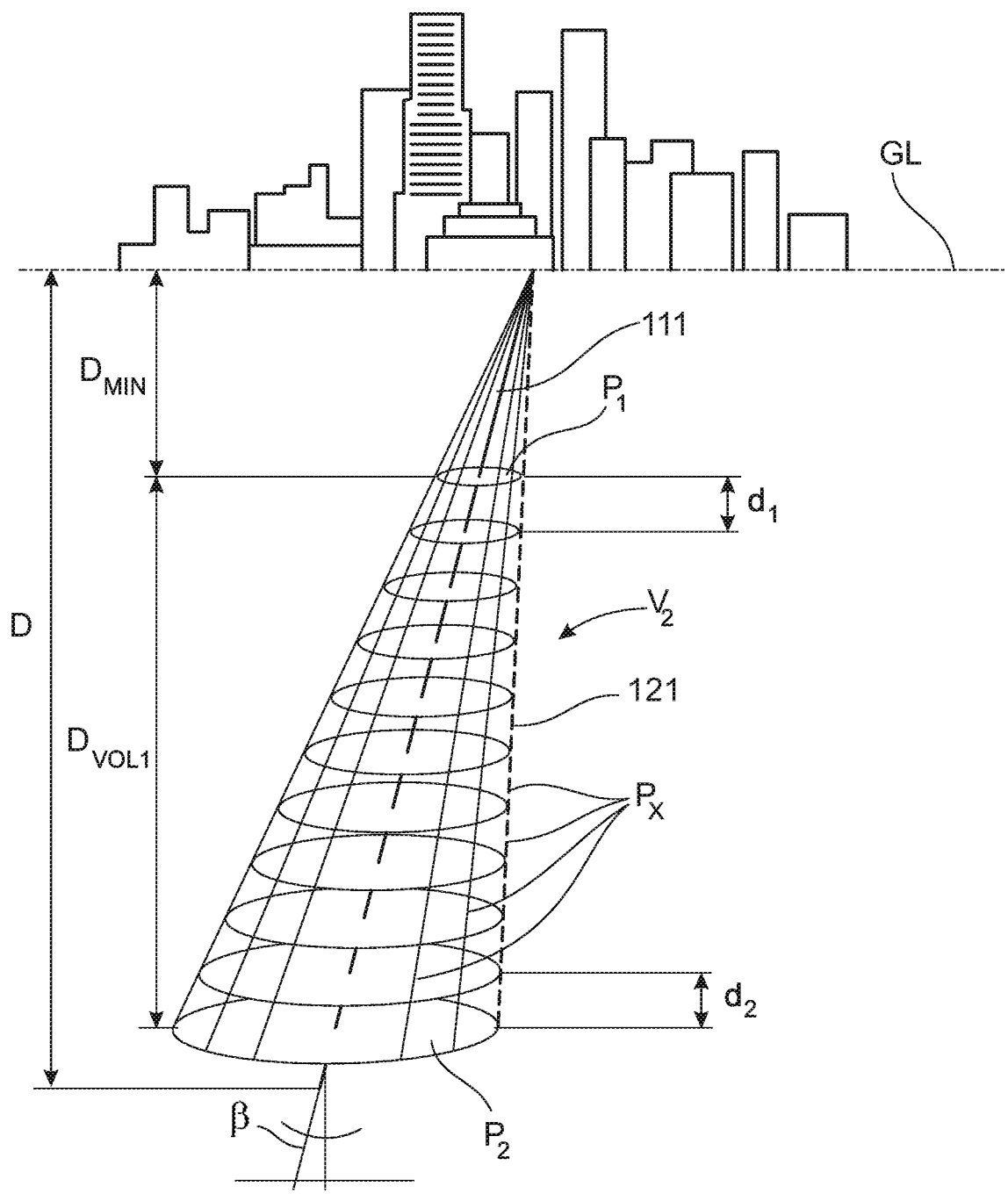
Figure 4:
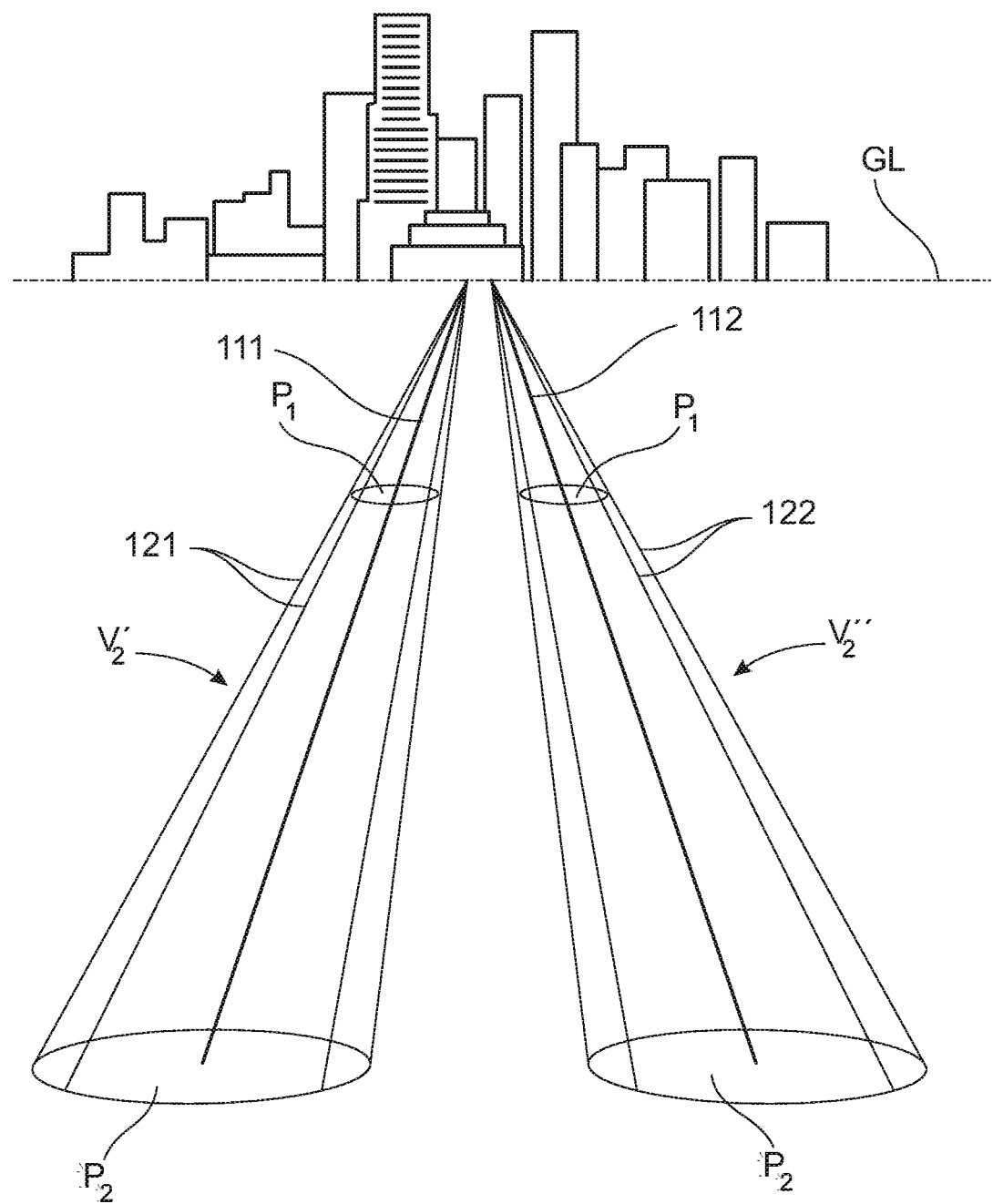
Figure 5A:
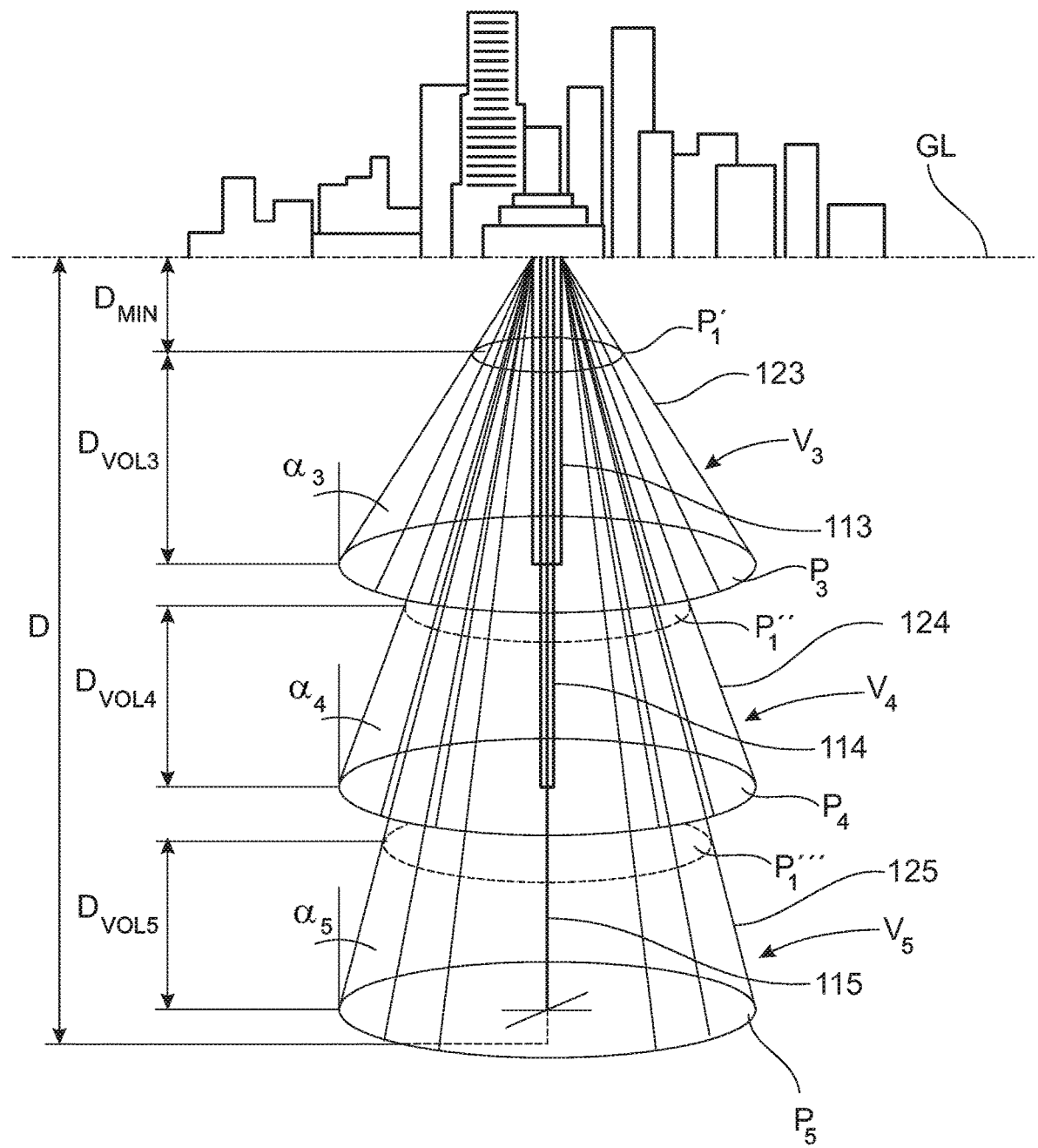
Figure 5B:
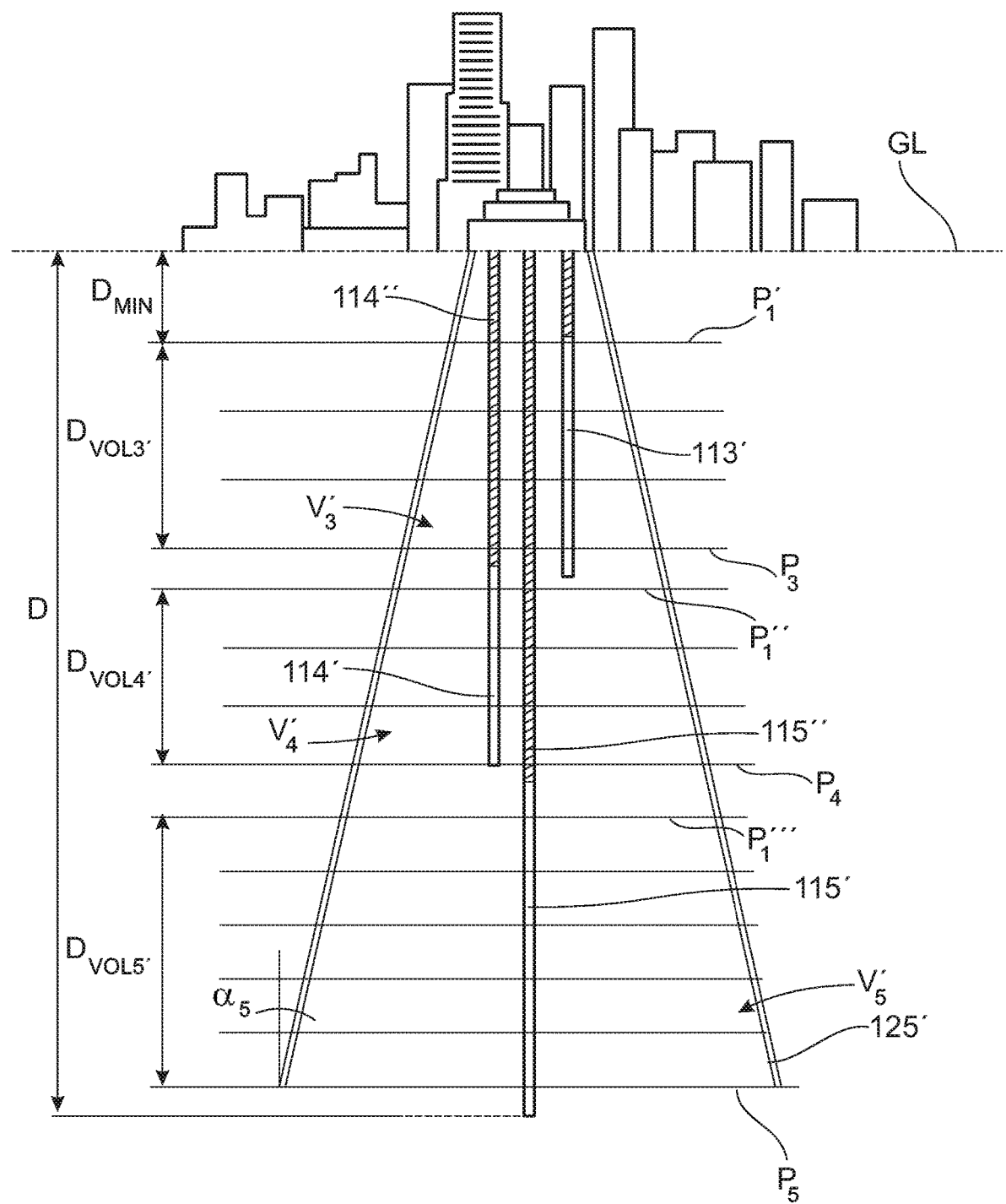
Figure 6:
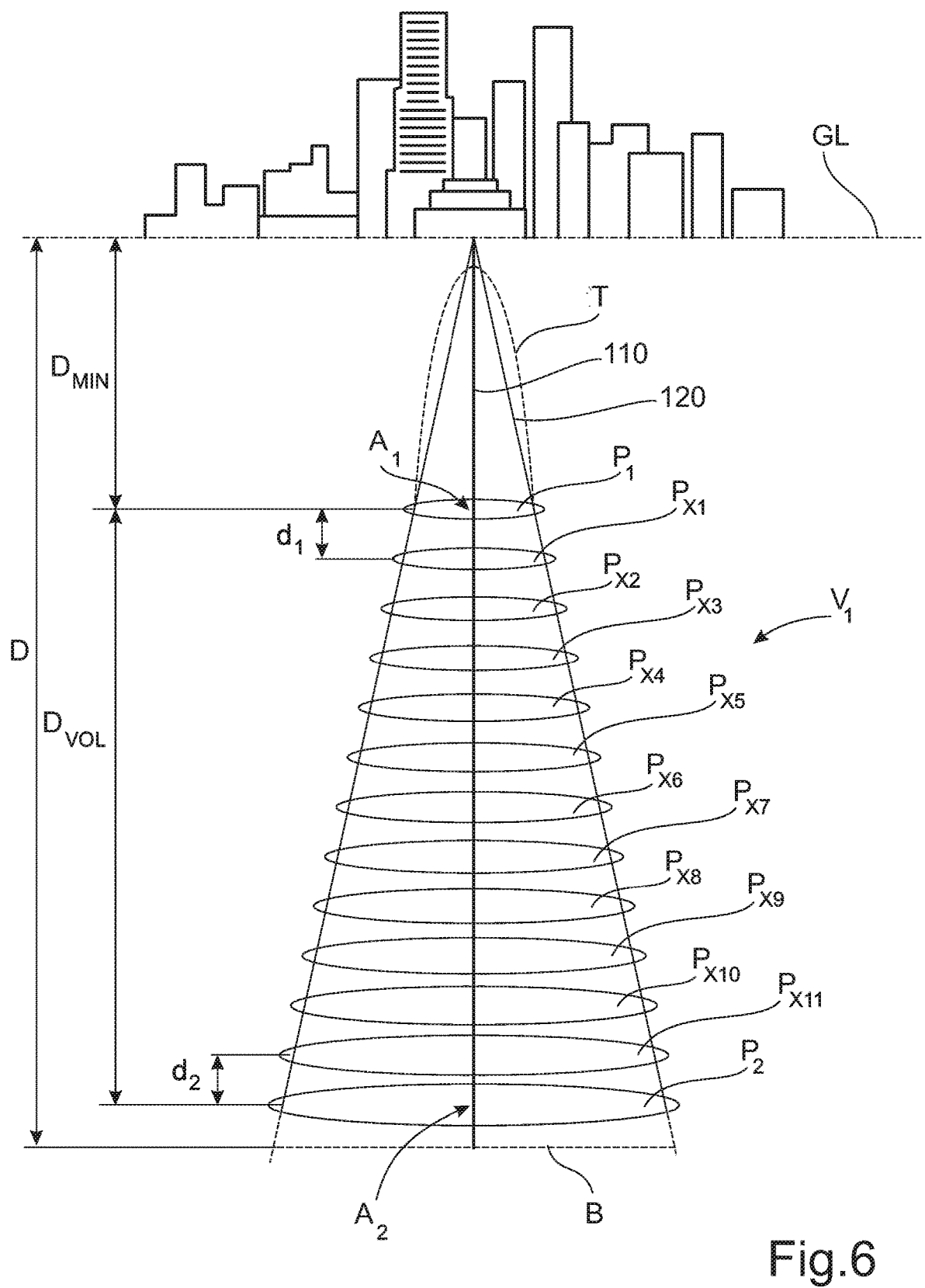
Figure 7:
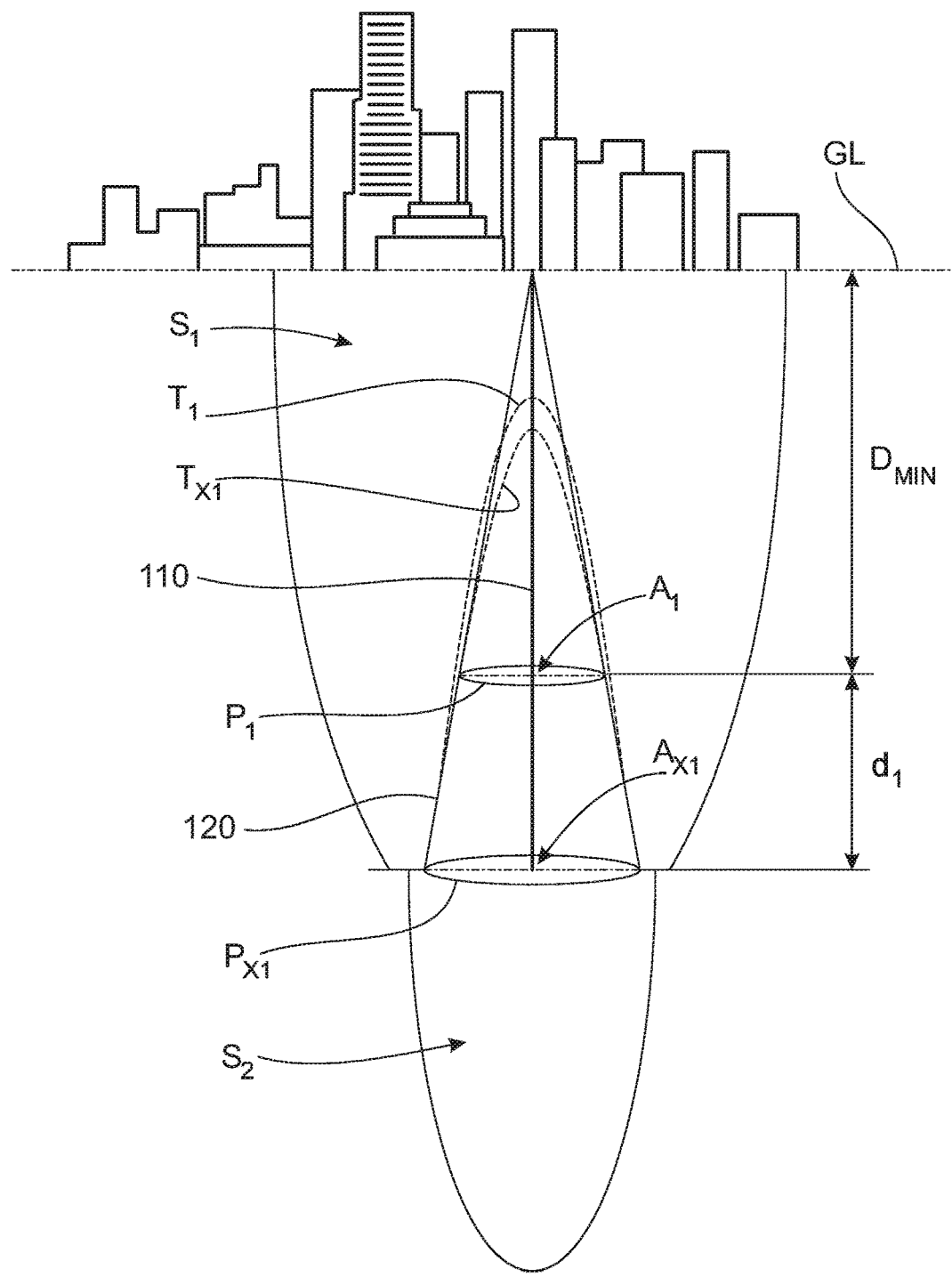
Figure 8:
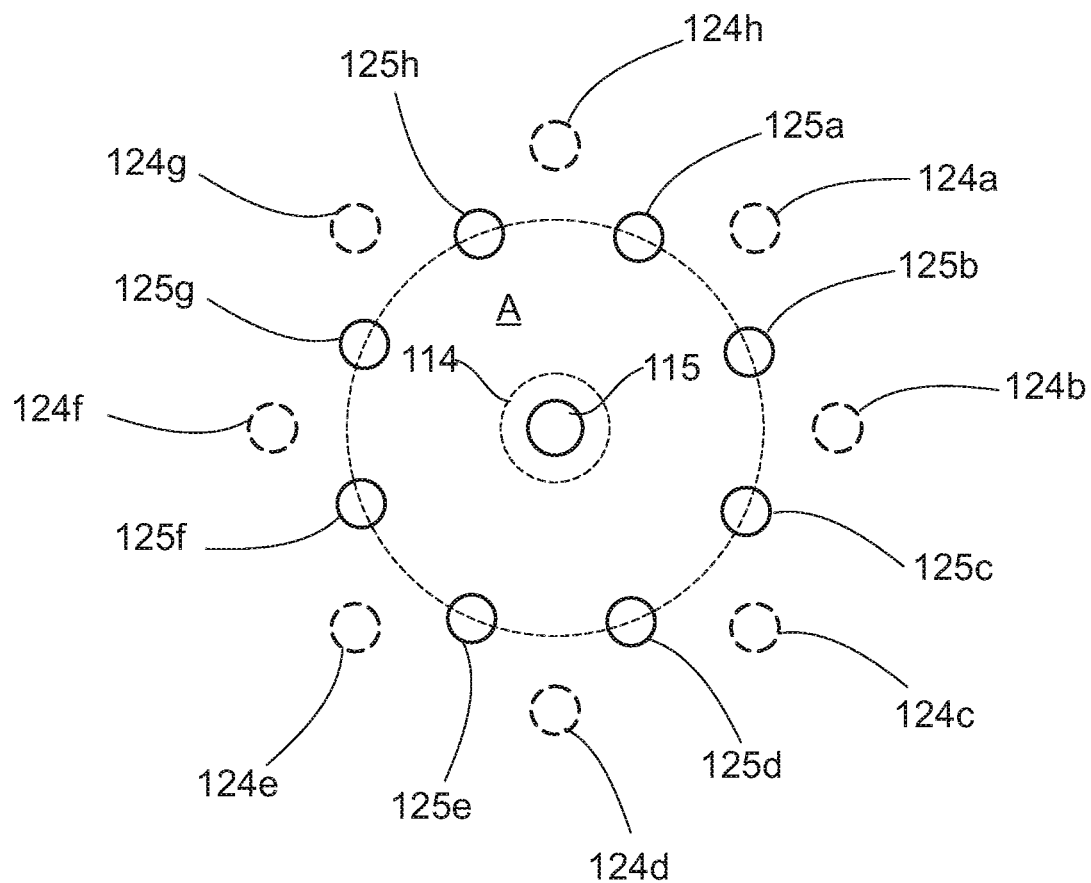
Figure 9:
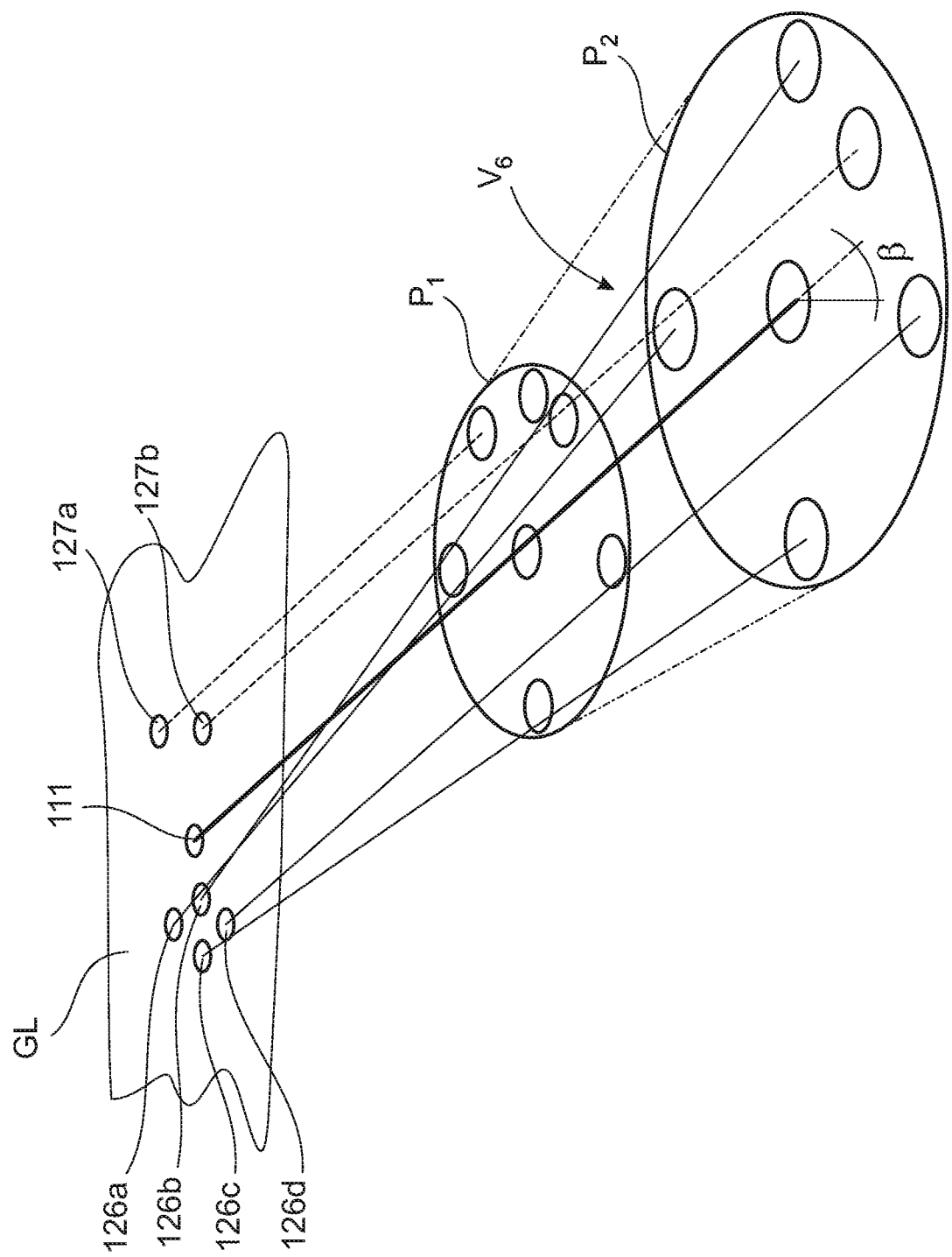

FIG. 3A a schematically indicated thermal energy storage as shown in FIG. 1A;

FIG. 3B a schematically indicated thermal energy storage as shown in FIG. 1B;

FIG. 4 shows a thermal energy storage comprising two storage volumes;

FIG. 5A shows a thermal energy storage comprising multiple primary boreholes;

FIG. 5B shows a thermal energy storage comprising concentric primary boreholes;

FIG. 6 shows a cross-sectional side view of a storage volume as shown in FIG. 3A;

FIG. 7 shows a schematic illustration of stress distribution in a rock body above a storage volume;

FIG. 8 shows an example of borehole distribution for a thermal energy storage; and FIG. 9 shows a perspective view of an alternative borehole distribution.

DETAILED DESCRIPTION

FIG. 1A shows a schematically indicated perspective view of a first example of a thermal energy storage 100 according to the invention.

According to this example, the thermal energy storage 100 comprises one thermal energy storage volume $V_1$. The storage volume comprises a primary borehole 110 extending from ground level GL to a first predetermined depth in a rock body. A set of secondary boreholes 120 is located around the primary borehole 110 and extend from ground level GL to the same or to individual depths in the rock body. In this example, the primary borehole 110 extends downwards in a vertical direction relative to a horizontal plane at ground level to the bottom or base B of the storage volume $V_1$.

The primary borehole can comprise a single borehole 110 or multiple boreholes (not shown). In the latter case, the primary boreholes can be concentric and extend to different depths wherein the borehole diameter decreases from an outer to an inner borehole. In this way, each such primary borehole can be provided for sections of the same storage volume or for different storage volumes located at different depths about the at least one primary borehole. Examples of multiple storage volumes will be described in further detail below. The at least one primary borehole 110 can have a greater diameter than the adjacent set of secondary boreholes 120, as multiple secondary boreholes are provided to supply a substantially central primary borehole. At least an upper fracture plane $P_1$ and a lower fracture plane $P_2$ extend in a radial and/or oblique plane from the primary borehole 110 towards adjacent secondary boreholes 120. A fluid, preferably water can flow between secondary boreholes 120 and a primary borehole 110 through the fracture planes $P_1$, $P_2$. The set of secondary boreholes 120 is drilled to diverge from the primary borehole 110 at least between the upper and the lower fracture planes $P_1$, $P_2$ with increasing depth. The secondary boreholes 120 and the upper and lower fracture planes $P_1$, $P_2$ define a general outer boundary for a storage volume surrounding the at least one primary borehole 110.

The storage volume indicated in FIG. 1A is schematically shown as an approximated, truncated cone, wherein the secondary boreholes 120 form generatrices G along this approximated cone. However, as will be described below, the volume shown illustrates an ideal shape that is usually not possible to achieve. This and the subsequent figures do not necessarily represent a real thermal energy storage but are mainly intended to illustrate the principle of the invention using simplified shapes such as symmetrical, asymmetrical or skewed cones.

Each set of secondary boreholes comprises at least two drilled holes extending from ground level to a predetermined depth in the rock body and intersecting at least one fractured plane. Although a minimum of two drilled holes per set of secondary boreholes is possible within the scope of the invention, it is preferable to provide three or more secondary boreholes per set in order to create a more distinct storage volume about the at least one primary borehole. The example shown in FIG. 1A indicates at least six secondary boreholes 120. Using multiple secondary boreholes per set will also allow the fracture planes to be utilized more effectively, as will be described below.

According to one example, the secondary boreholes can be located adjacent the primary borehole either around it in an equidistant or a more or less evenly distributed pattern (see FIG. 8). Alternatively, the secondary boreholes can be located in one or more clusters of two or more boreholes to at least one side of the primary borehole (see FIG. 9). Variations in numbers and/or the distribution about the central borehole can be caused by a number of factors, such as geological conditions or by an active selection of the borehole position to enable a secondary borehole to reach a particular fracture plane or to avoid obstacles, such as local infrastructure or an undesirable rock formation.

Individual secondary boreholes 120 within a set can be drilled at a desired angle relative to the at least one primary borehole, but this angle is likely to vary from hole to hole as indicated by the drilling angles $\alpha_1$ and $\alpha_2$ in FIG. 1A. The desired angle is selected together with the relative locations of the upper and lower fracture planes $P_1$, $P_2$ to achieve a storage volume for a thermal energy storage having a desired size and heat storage capacity (see FIGS. 3A-3B). In the case of a vertical primary borehole, a secondary borehole can diverge away from the primary borehole at angles up to 45° from the vertical direction at each fractured plane level. Variations in the drilling angle can be caused by a number of factors, such as geological conditions, obstacles in the form of infrastructure, or by an active selection to enable a secondary borehole to reach a particular fracture plane. In FIG. 1A, the secondary boreholes 120 are arranged to reach ground level GL without intersecting the primary borehole 110. In the first example this is achieved by locating the apex of an imaginary approximated cone defined by the secondary boreholes 120 above ground level GL.

FIG. 1B shows a schematically indicated perspective view of a second example of a thermal energy storage 100 according to the invention.

In the same way as the example in FIG. 1A, the thermal energy storage 100 in FIG. 1B comprises one thermal energy storage volume $V_2$. The storage volume comprises a primary borehole 111 extending from ground level GL to a first predetermined depth in a rock body. A set of secondary boreholes 121 is located around the primary borehole 111 and extend from ground level GL to the same or to individual depths in the rock body. At least an upper fracture plane $P_1$ and a lower fracture plane $P_2$ extend in a radial and/or oblique plane from the primary borehole 111 towards adjacent secondary boreholes 121. The set of secondary boreholes 121 is drilled to diverge from the primary borehole 111 at least between the upper and the lower fracture planes $P_1$, $P_2$ with increasing depth. The secondary boreholes 121 and the upper and lower fracture planes $P_1$, $P_2$ define a general outer boundary of an artificial storage volume surrounding the at least one primary borehole 111.

In this example, the primary borehole 111 extends downwards at an acute angle ß to the vertical direction, relative to a horizontal plane at ground level. In cases where the primary borehole 111 extends downwards at an acute angle ß to the vertical direction, then the drilling angles of the secondary boreholes 121 located about the primary borehole 111 between the upper and lower fracture planes $P_1$, $P_2$ is limited to an angle of 45° to the primary borehole 111.

In the same way as in FIG. 1A, the storage volume indicated in FIG. 1B is schematically shown as an approximated, truncated cone, wherein the secondary boreholes 121 form generatrices G along this approximated cone. Individual secondary boreholes 121 within a set can be drilled at a desired angle relative to the primary borehole 111, but this angle is likely to vary from hole to hole as indicated by the drilling angles $\alpha_3$ and $\alpha_4$ in FIG. 1B. In FIG. 1B, the secondary boreholes 121 are arranged to reach ground level GL without intersecting the primary borehole 111. In the same way as in the first example this is achieved by locating the apex of an imaginary approximated cone defined by the secondary boreholes 120 above ground level GL.

Figure 2:
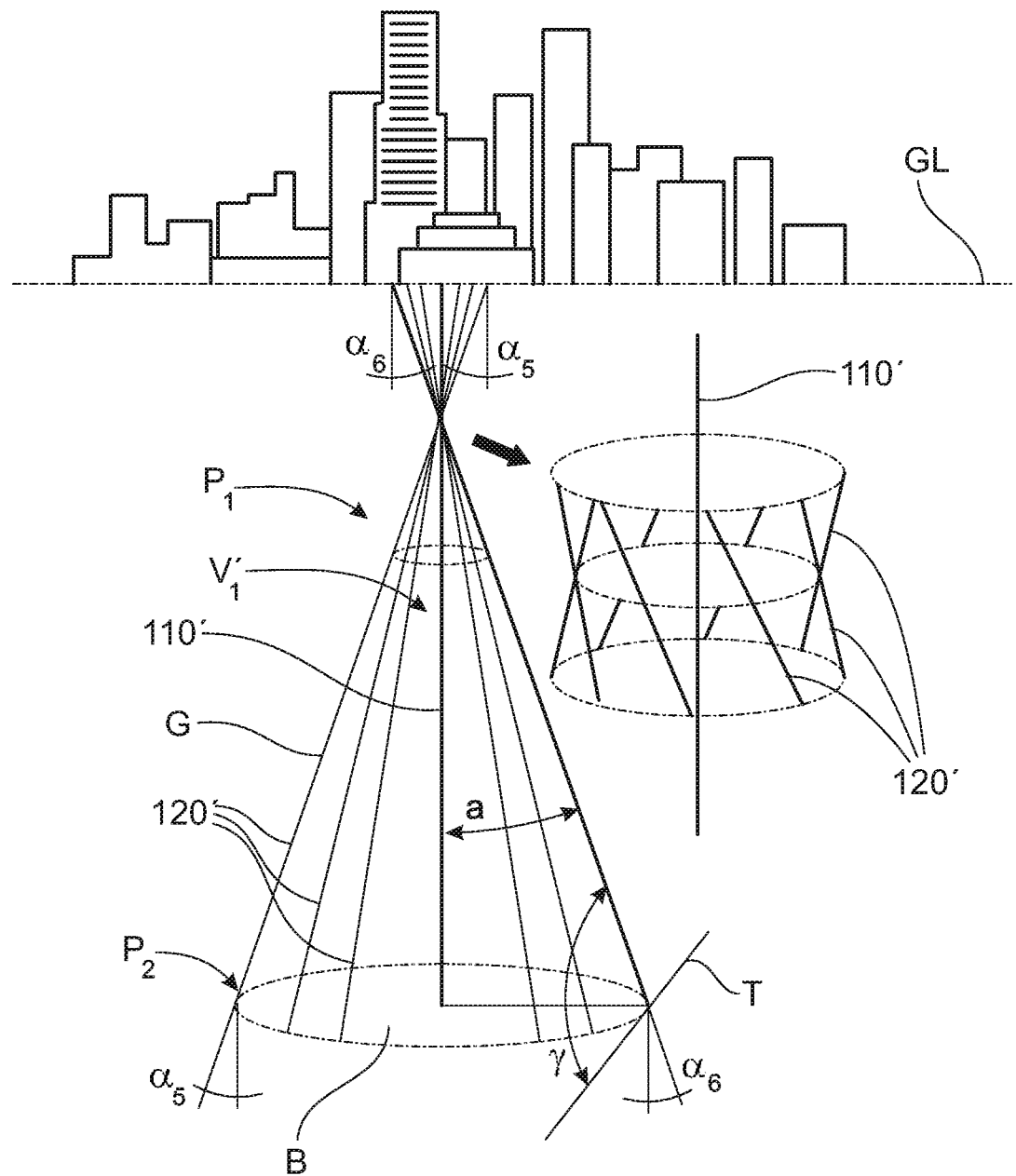
FIG. 2 shows a schematically indicated perspective view of a third example of a thermal energy storage according to the invention.

FIG. 2 shows a schematically indicated perspective view of a third example of a thermal energy storage 100 according to the invention.

In the same way as the examples in FIGS. 1A and 1B, the thermal energy storage 100 in FIG. 2 comprises one thermal energy storage volume $V'_1$. The storage comprises a primary borehole 110' extending from ground level GL to a first predetermined depth in a rock body. A set of secondary boreholes 120' is located around the primary borehole 110' and extends from ground level GL to the same or to individual depths in the rock body. In this example, the primary borehole 110' extends downwards in a vertical direction relative to a horizontal plane at ground level to the bottom or base B of the storage volume $V'_1$. At least an upper fracture plane $P_1$ and a lower fracture plane $P_2$ extend in a radial and/or oblique plane from the primary borehole 110' towards adjacent secondary boreholes 120'. The set of secondary boreholes 120' is drilled to diverge from the primary borehole 110' at least between the upper and the lower fracture planes $P_1$, $P_2$ with increasing depth. The secondary boreholes 120' and the upper and lower fracture planes $P_1$, $P_2$ define a general outer boundary of a storage volume surrounding the at least one primary borehole 110'.

In the same way as in FIG. 1A, the storage volume indicated in FIG. 2 is schematically shown as an approximated, truncated cone, wherein the secondary boreholes 120' form generatrices G along this approximated cone. Individual secondary boreholes 120' within a set can be drilled at a desired angle relative to the vertical at ground level, but this angle is likely to vary from hole to hole as indicated by the drilling angles as and as in FIG. 2.

In addition to the drilling angle described above, each secondary borehole 120' is arranged at an angle out of a radial plane through the least one primary borehole 110'. Normally, a secondary borehole that is arranged as generatrix G along an approximate cone making up a storage volume would be arranged at right angles to a tangent T to the base B of the approximate cone. In the example shown in FIG. 2, the secondary boreholes 120' are arranged at an angle γ to a tangent T to the base B where the radial plane intersects the base B. The angle γ can differ less than a degree from 90°. This angle γ is selected to allow the secondary boreholes 120' to pass a suitable minimum distance to one side of the primary borehole 110' between the upper fracture plane and ground level, as indicated in the enlarged portion of FIG. 2. The angle γ is dependent on the required minimum distance between the primary borehole and the secondary borehole, and on the depth of the secondary borehole extending past an imaginary apex of the storage volume. This arrangement ensures that the secondary boreholes do not intersect the least one primary borehole at any point along its extension. This is also why the drilling angles as and as are measured relative to a vertical line at ground level instead of the primary borehole 110'. In FIG. 2, the secondary boreholes 120' are arranged to reach ground level GL without having intersected the primary borehole 110' at any point. As opposed to the first and second examples the third example indicates that the apex of an imaginary approximated cone defined by the secondary boreholes 120' is located below ground level GL. An advantage of this arrangement is that the storage volume will diverge further down below ground level GL compared to a storage volume shown in FIG. 1A. This will for instance allow for larger drilling angles for the secondary boreholes without interfering with adjacent underground infrastructure.

The example shown in FIG. 2 discloses a vertical primary borehole 110', but a further example (not shown) can of course involve placing a primary borehole at an acute angle to the ground level GL as described in FIG. 1B.

FIGS. 1A, 1B and 2 indicate a non-excluding set of different possible arrangements of a storage volume in a thermal energy storage according to the invention. The inventive concept makes it possible to select a suitable angle for the primary borehole depending on factors such as local geological conditions, local underground infrastructure, available drilling site sizes and positions relative to a suitable rock body and/or the number and relative positions of individual planned storage volumes.

In addition, the angle of a primary borehole can be adapted to the local stress direction controlling fissure planes in the rock body in order to achieve fracture planes in a substantially radial direction from the primary borehole. As indicated above, fissure planes in a rock body can have an inclination of 20° but will usually not exceed 30° from a horizontal plane. The primary borehole can in such cases be drilled at right angles to the inclination of the fissure planes. The at least one primary borehole is drilled to a first predetermined depth that is preferably, but not necessarily, greater that the depth of the boreholes drilled for an adjacent set of secondary boreholes. The primary borehole can comprise a single borehole or multiple boreholes. In the latter case, the primary boreholes can be concentric and extend to different depths wherein the borehole diameter decreases from an outer to an inner borehole. In this way, each such primary borehole can be provided for artificial storage volumes or sections thereof located at different depths about the at least one primary borehole. The at least one primary borehole has a greater diameter than the adjacent set of secondary boreholes, as multiple secondary boreholes are provided to supply a substantially central primary borehole.

FIG. 3A shows a schematically indicated thermal energy storage as shown in FIG. 1A. The thermal energy storage 100 comprises one thermal energy storage volume $V_1$. The storage comprises a primary borehole 110 extending from ground level GL to a first predetermined depth D in a rock body. A set of secondary boreholes 120 are located around the primary borehole 110 and extend from ground level GL to the same or to individual depths in the rock body. In this example, the primary borehole 110 extends downwards in a vertical direction relative to a horizontal plane at ground level to the bottom or a base B of the storage volume $V_1$. An upper fracture plane $P_1$ and a lower fracture plane $P_2$ extend in a radial plane from the primary borehole 110 towards adjacent secondary boreholes 120. The upper fracture plane $P_1$ is located at a minimum depth $D_{min}$ and the distance between the upper and lower fracture planes $P_1$, $P_2$ is represented by a storage volume depth $D_{vol}$ for a storage volume $V_1$. In FIG. 3A, multiple fracture planes $P_1$ are arranged between the upper fracture plane $P_1$ and the lower fracture plane $P_2$. A fluid, preferably water, can flow between secondary boreholes 120 and a primary borehole 110 through the fracture planes $P_1$, $P_2$. The spacing between fracture planes, as illustrated by the spacings $d_1$, $d_2$ between the upper fracture plane $P_1$ or the lower fracture plane $P_2$ and a respective immediately adjacent fracture plane $P_1$ can be constant or vary throughout the depth $D_{vol}$ of the storage volume $V_1$.

According to one example, the cumulative aperture area of all fracture planes from the upper fracture plane $P_1$ to the lower fracture plane $P_2$, measured adjacent the primary borehole 110, is preferably distributed in the vertical direction so that at least half the cumulative aperture area is located at or below a point half way between the upper and lower fracture planes $P_1$; $P_2$. According to a further example, the fracture plane apertures can increase from the upper fracture plane $P_1$ towards the lower fracture plane $P_2$. The size of each fracture plane aperture is selected based on a desired flow rate and an allowable pressure drop for each fracture plane. This arrangement will improve the flow of water by forced circulation through the storage volume and minimize the risk of heave at or immediately below ground level.

The set of secondary boreholes 120 is drilled to diverge from the primary borehole 110 at least between the upper and the lower fracture planes $P_1$, $P_2$ with increasing depth. The secondary boreholes 120 and the upper and lower fracture planes $P_1$, $P_2$ define a general outer boundary of a storage volume $V_1$ surrounding the at least one primary borehole 110.

The total or effective volume of a thermal energy storage will be larger than a storage volume defined by the secondary boreholes and the upper and lower fracture planes. This total volume is difficult to determine, as it extends outside the secondary boreholes and the upper and lower fracture planes defining a general outer boundary of a storage volume surrounding the at least one primary borehole. The term "storage volume" refers to an artificial thermal storage volume as defined above. The total volume comprises the artificial storage volume where forced circulation of water occurs and an additional volume of the rock body surrounding the storage volume.

The additional volume surrounding the storage volume is heated or cooled by conduction from hot or cold water circulating through the storage volume and can provide a substantial addition to the capacity of the thermal energy storage. A major portion of the additional volume comprises an approximate conical volume located below the lower fracture plane and can store heat or cold even though no water is circulated through it. Also, the fracture planes will as a rule extend beyond the secondary boreholes and into the additional volume. The flow of water through the portions of the fracture planes extending past the secondary boreholes will be negligible compared to the total flow through the artificial storage volume, but it will contribute to the heating or cooling of the additional volume.

The volume $V_1$ in FIG. 3A is located with a first fracture plane $P_1$ at a minimum depth $D_{min}$ below ground level GL. The minimum depth $D_{min}$ should be at least 25 meters below ground level GL. The minimum depth is selected based on local geological conditions and can be limited by allowable limits for heave at ground level or for displacement of underground infrastructure during hydraulic fracturing of the uppermost fracture planes. A minimum depth of 50 metres can all but eliminate the occurrence of heave at or just below ground level GL. The storage volume $V_1$ extends from the minimum depth $D_{min}$ and down to a desired volume depth $D_{vol}$. The desired volume depth $D_{vol}$ is calculated after the drilling of the primary borehole 110. The calculations can be made based on data from the local area or from data collected from the primary borehole. The calculations consider factors such as the size of storage volume required for a desired capacity of the thermal energy storage, drilling angles for the secondary boreholes 120 and available depth in the rock body. Generally, the first predetermined depth D should only exceed 300 meters if this is allowed by local geological conditions, as fracturing of horizontal fracture planes can become difficult at greater depths.

The size of the storage volume, the number of fracture planes within each storage volume and the spacing between adjacent fracture planes is determined by considering a number of factors. A non-exhaustive list of such factors include composition and structures of the rock, the heat-conducting capacity of the rock, the cumulative aperture area of all fracture planes required for a desired flow, total surface area of the fracture planes, period of the load cycle, the temperature of the water to be supplied during charging, the desired flow rate to be withdrawn during discharging and the desired storage capacity of the thermal energy storage.

FIG. 3B shows a schematically indicated thermal energy storage as shown in FIG. 1B. The thermal energy storage 100 comprises one thermal energy storage volume $V_2$. The storage comprises a primary borehole 111 extending from ground level GL to a first predetermined depth D in a rock body. A set of secondary boreholes 121 is located around the primary borehole 111 and extends from ground level GL to the same or to individual depths in the rock body. In this example, the primary borehole 111 extends downwards at an acute angle ß relative to a horizontal plane at ground level GL to the bottom or a base B of the storage volume $V_2$. An upper fracture plane $P_1$ and a lower fracture plane $P_2$ extend in a radial plane from the primary borehole 111 towards adjacent secondary boreholes 121. The upper fracture plane $P_1$ is located at a minimum depth $D_{min}$ and the distance between the upper and lower fracture planes $P_1$, $P_2$ is represented by a storage volume depth $D_{vol}$ for a storage volume $V_2$. In FIG. 3B, multiple fracture planes $P_x$ are arranged between the upper fracture plane $P_1$ and the lower fracture plane $P_2$. A fluid, preferably water, can flow between secondary boreholes 121 and a primary borehole 111 through the fracture planes $P_1$, $P_2$. The spacing between fracture planes, as illustrated by the spacings $d_1$, $d_2$ between the upper fracture plane $P_1$ or the lower fracture plane $P_2$ and a respective immediately adjacent fracture plane $P_x$, can be constant or vary throughout the depth $D_{vol}$ of the storage volume $V_2$.

According to one example, the cumulative aperture area of all fracture planes from the upper fracture plane $P_1$ to the lower fracture plane $P_2$, measured adjacent the primary borehole 111, is preferably distributed along the primary borehole so that at least half the cumulative aperture area is located at or below a point half way between the upper and lower fracture planes $P_1$; $P_2$. According to a further example, the fracture plane apertures can increase from the upper fracture plane $P_1$ towards the lower fracture plane $P_2$. The size of each fracture plane aperture is selected based on a desired flow rate and an allowable pressure drop for each fracture plane.

The set of secondary boreholes 121 is drilled to diverge from the primary borehole 111 at least between the upper and the lower fracture planes $P_1$, $P_2$ with increasing depth. The secondary boreholes 121 and the upper and lower fracture planes $P_1$, $P_2$ define a general outer boundary of a storage volume $V_1$ surrounding the at least one primary borehole 111. As described above, the total or effective volume of a thermal energy storage will be larger than a storage volume.

The volume $V_1$ in FIG. 3B is located with a first fracture plane $P_1$ at a minimum depth $D_{min}$ below ground level GL. The minimum depth $D_{min}$ for storage volumes according to the invention should be at least 25 meters below ground level GL. The minimum depth is selected based on local geological conditions and can be limited by allowable limits for heave at ground level during hydraulic fracturing of the uppermost fracture planes. Tests have indicated that a minimum depth of 50 metres can all but eliminate the occurrence of heave at ground level GL. A further effect of using a primary borehole drilled a tan angle ß to the vertical is that a subsequent fracturing operation will cause underground rock displacement in areas remote from the drilling site. By selecting a suitable direction for a storage volume in the direction away from the drilling site, possible heave at ground level as a result of hydraulic fracturing to create fracture planes can be placed in a location where it will not disturb infrastructure at or below the surface. This effect of displacing the area that may be affected by heave at ground level away from the drilling site will be more pronounced as the drilling angle ß for the primary borehole is increased.

The storage volume $V_1$ extends from the minimum depth $D_{min}$ and down to a desired volume depth $D_{vol}$. The desired volume depth $D_{vol}$ is calculated prior to drilling of the primary borehole 111, which calculations consider factors such as the size of storage volume required for a desired capacity, drilling angle for the secondary boreholes 121 and available depth in the rock body. Generally, the first predetermined depth D should only exceed 300 meters if this is allowed by local geological conditions, as fracturing of horizontal fracture planes can become difficult at greater depths due to a vertical stress higher than the least horizontal stress.

The size of the storage volume, the number of fracture planes within each storage volume and the spacing between adjacent fracture planes is determined by considering a number of factors. A non-exhaustive list of such factors include rock composition/structure, the heat-conducting capacity of the rock, the cumulative aperture area of all fracture planes required for a desired flow, total surface area of the fracture planes, load cycle period, the temperature of the water to be supplied during charging, the desired flow rate to be withdrawn during discharging and the desired storage capacity of the thermal energy storage.

FIG. 4 shows a thermal energy storage 200 comprising two storage volumes $V'_2$, $V''_2$ of the type indicated in FIGS. 1B and 3B. Each storage volume $V'_2$, $V''_2$ comprises a primary borehole 111, 112 extending from ground level GL to a first predetermined depth in a rock body (see FIG. 3B). A set of secondary boreholes 121, 122 for each storage volume $V'_2$, $V''_2$ is located around its respective primary borehole 111, 112 and extend from ground level GL to the same or to individual depths in the rock body. In each storage volume $V'_2$, $V''_2$ at least an upper fracture plane $P_1$ and a lower fracture plane $P_2$ extend in a radial and/or oblique plane from the respective primary borehole 111, 112 towards adjacent secondary boreholes 121, 122. Each set of secondary boreholes 121, 122 is drilled to diverge from its respective primary borehole 111, 112 at least between its respective upper and lower fracture planes $P_1$, $P_2$ with increasing depth. The secondary boreholes 121, 122 and their upper and lower fracture planes $P_1$, $P_2$ define general outer boundaries of a pair of storage volume $V'_2$, $V''_2$ surrounding the respective primary borehole 111, 112.

In this example, the primary boreholes 111, 112 extend downwards acute angles $\beta_1$, $\beta_2$ to the vertical direction, relative to a horizontal plane at ground level GL. In cases where the primary boreholes 111, 112 extends downwards acute angles to the vertical direction, then the drilling angle of secondary boreholes 121, 122 located about the respective primary borehole 111, 112 between its associated upper and lower fracture planes $P_1$, $P_2$ is limited to an angle of 45° to its respective primary borehole 111, 112.

An advantage of the solution shown in FIG. 4 is that two or more storage volumes can be constructed with a minimum footprint at ground level. Although the solution requires more primary and secondary boreholes, it is possible to achieve a very large storage volume without having to increase the drilling angles of the secondary boreholes beyond desirable limits.

FIG. 5A shows a thermal energy storage comprising multiple storage volumes $V_3$, $V_4$, $V_5$ of the type indicated in FIGS. 1A and 3A. In this example the thermal energy storage comprises three storage volumes $V_3$, $V_4$, $V_5$ located concentrically about multiple vertical central primary boreholes 113, 114, 115 at successively increasing depths. The primary boreholes 113, 114, 115 are concentric and extend coaxially to different depths. The borehole diameter decreases from an outer borehole 113 to an inner borehole 115, wherein an annular first outer primary borehole 113 extends to the bottom of an upper storage volume $V_3$. Similarly, an annular second outer primary borehole 114 extends to the bottom of an intermediate storage volume $V_4$. Finally, a central third outer primary borehole 115 extends to a depth D past the bottom of a lower storage volume $V_5$.

FIG. 5A schematically indicates the depths $D_{vol3}$, $D_{vol4}$, $D_{vol5}$ in the vertical direction for each storage volume $V_3$, $V_4$, $V_5$. In this case, each set of secondary boreholes 123, 124, 125 diverges from its respective primary borehole 113, 114, 115 at angles $V_3$, $V_4$, $V_5$ that are reduced with each successive thermal energy storage volume $V_3$, $V_4$, $V_5$ so that $\alpha_3 > \alpha_4 > \alpha_5$. Each successive storage volume $V_3$, $V_4$, $V_5$ comprises a respective upper fracture plane $P'_1$, $P''_1$, $P'''_1$ and a respective lower fracture plane $P_3$, $P_4$, $P_5$ located so that each storage volume $V_3$, $V_4$, $V_5$ is physically separated from adjacent storage volumes in the vertical direction. Intermediate fracture planes (see FIG. 3A) are not shown for reasons of clarity. The fracture planes permit a hydraulic flow between the secondary boreholes and the at least one primary borehole within each storage volume. Each storage volume $V_3$, $V_4$, $V_5$ within the thermal energy storage has a general outer boundary defined by one set of secondary boreholes 123, 124, 125 and its associated upper and lower fracture planes.

As stated above, each set of secondary boreholes 123, 124, 125 diverge away from their respective primary boreholes 113, 114, 115 at each fractured plane level, without intersecting any one of the primary boreholes. In this way, a relatively large combined storage volume can be achieved while the footprint of the thermal energy storage can be kept relatively small at ground level.

FIG. 5B show a side view of an alternative thermal energy storage comprising multiple storage volumes $V'_3$, $V'_4$, $V'_5$ of the type indicated in FIGS. 1A and 3A. In this example the thermal energy storage comprises three storage volumes $V'_3$, $V'_4$, $V'_5$ located around a cluster of multiple vertical central primary boreholes 113', 114', 115' at successively increasing depths. The primary boreholes 113', 114', 115' are located in a central cluster and extend alongside each other to different depths. In this example, the three primary boreholes can be arranged in a triangular pattern or in line with each other. The primary boreholes can extend downwards in parallel or diverging away from each other at a predetermined divergence angle with increasing depth. A suitable divergence angle in this example can be 1-2°. The borehole depth increases from a first primary borehole 113' to a third primary borehole 115', wherein the first primary borehole 113' extends to the bottom of an upper storage volume $V'_3$. Similarly, a second primary borehole 114' extends to the bottom of an intermediate storage volume $V'_4$. Finally, a third primary borehole 115' extends to a depth D past the bottom of a lower storage volume $V'_5$.

FIG. 5B schematically indicates the depths $D_{vol3}$, $D_{vol4}$, $D_{vol5}$ in the vertical direction for each storage volume $V'_3$, $V'_4$, $V'_5$. In this case, a common set of secondary boreholes 125' diverges from the clustered primary boreholes 113', 114', 115' at an approximate angle as. Each successive storage volume $V'_3$, $V'_4$, $V'_5$ comprises a respective upper fracture plane $P'_1$, $P''_1$, $P'''_1$ and a respective lower fracture plane $P_3$, $P_4$, $P_5$ located so that each storage volume $V'_3$, $V'_4$, $V'_5$ is physically separated from adjacent storage volumes in the vertical direction. Intermediate fracture planes (see FIG. 3A) are only schematically indicated. The fracture planes permit a hydraulic flow between the secondary boreholes and the at least one primary borehole within each storage volume. In order to achieve this, the first primary borehole 113' extends past its lower fracture plane $P_3$, but not into the upper fracture plane $P''_1$ of the intermediate storage volume $V'_4$. The second primary boreholes 114' extends past its lower fracture plane $P_4$, but not into the upper fracture plane $P'''_1$ of the lower storage volume $V'_5$. An upper portion 114" of the second primary boreholes 114' extending between its upper fracture plane $P''_1$ and ground level GL is provided with a liner that prevents fluid communication between the second primary boreholes 114' and the upper storage volume $V'_3$. Similarly an upper portion 115" of the second primary boreholes 115' extending between its upper fracture plane $P'''_1$ and ground level GL is provided with a liner that prevents fluid communication between the third primary boreholes 115' and the upper and the intermediate storage volumes $V'_3$, $V'_4$. In FIG. 5B the first primary borehole 113' is shown with an optional liner 113" between ground level GL and the upper fracture plane $P'_1$ of the upper storage volume $V'_3$. This liner 113" is provided if required by local geological conditions.

Each storage volume $V'_3$, $V'_4$, $V'_5$ within the thermal energy storage has a general outer boundary defined by the set of secondary boreholes 125' and their associated upper and lower fracture planes.

As stated above, the boreholes within the set of secondary boreholes 125' diverge away from the primary boreholes 113', 114', 115' at each fractured plane level, without intersecting any one of the primary boreholes. In this way, a relatively large combined storage volume can be achieved while the footprint of the thermal energy storage can be kept relatively small at ground level.

The invention is not limited to the examples shown in FIGS. 1-5B. Hence, it is possible to combine not only vertical and inclined storage volumes, but also storage volumes having a schematic apex located above or below ground level in the same thermal energy storage. Further, a thermal energy storage comprising multiple storage volumes of the type shown in FIGS. 5A and 5B can also comprise storage volumes with inclined primary boreholes.

FIG. 6 shows a schematic cross-sectional side view of a storage volume as shown in FIG. 3A. The thermal energy storage 100 comprises one thermal energy storage volume $V_1$. The storage comprises a primary borehole 110 extending from ground level GL to a first predetermined depth in a rock body. A set of secondary boreholes 120 are located around the primary borehole 110 and extend from ground level GL to the same or to individual depths in the rock body. The primary borehole 110 extends downwards in a vertical direction relative to a horizontal plane at ground level to the bottom or a base B of the storage volume $V_1$. The set of secondary boreholes 120 is drilled to diverge from the primary borehole 110 at least between an upper and a lower fracture plane $P_1$, $P_2$ with increasing depth. An upper fracture plane $P_1$ and a lower fracture plane $P_2$ extend in a radial plane from the primary borehole 110 towards adjacent secondary boreholes 120. The upper fracture plane $P_1$ is located at a minimum depth $D_{min}$ and the distance between the upper and lower fracture planes $P_1$, $P_2$ is represented by a storage volume depth $D_{vol}$. The minimum depth is selected based on local geological conditions and can be limited by allowable limits for heave at ground level during hydraulic fracturing of the uppermost fracture planes.

In FIG. 6, multiple fracture planes $P_{x1}$-$P_{x11}$ are arranged between the upper fracture plane $P_1$ and the lower fracture plane $P_2$. In order to allow hydraulic fracturing of the lower fracture plane $P_2$ at a desired depth, the primary borehole 110 must extend past this level in order to accommodate sealing sleeves and other necessary equipment for fracturing. A fluid, preferably water, can flow between secondary boreholes 120 and a primary borehole 110 through the fracture planes $P_1$, $P_2$, $P_{x1}$-$P_{x11}$. The spacing between fracture planes, as illustrated by the spacings $d_1$, $d_2$ between the upper fracture plane $P_1$ or the lower fracture plane $P_2$ and their respective immediately adjacent fracture planes $P_{x1}$ and $P_{x11}$, can be constant or vary throughout the depth $D_{vol}$ of the storage volume $V_1$.

As opposed to FIGS. 1-5 which are perspective views indicating the general locations of fracture planes, FIG. 6 is a side view showing a schematic cross-section through multiple fracture planes. FIG. 6 shows a very schematic representation of such fracture planes and the extent the fractured fissures in the radial direction away from the primary borehole 110 and past the secondary boreholes 120. According to one example, the cumulative aperture area of all fracture planes from the upper fracture plane $P_1$ to the lower fracture plane $P_2$, measured adjacent the primary borehole 110, is preferably distributed in the vertical direction so that at least half the cumulative aperture area is located at or below a point half way between the upper and lower fracture planes $P_1$; $P_2$. According to a further example, the fracture plane apertures can increase from the upper fracture plane $P_1$ towards the lower fracture plane $P_2$. The size of each fracture plane aperture is selected based on a desired flow rate and an allowable pressure drop for each fracture plane.

When a fracture plane is hydraulically fractured an elevated hydraulic pressure applied to a limited section of the primary borehole. The pressure will cause fractures in the rock to open up along existing fissure planes and the fracture plane will extend outwards from the pressurized section of the primary borehole as far as can be achieved by the currently applied pressure. For instance, a fracture plane having a relatively large surface area will require a corresponding relatively large aperture in order to achieve a desired through-flow, which in turn requires a relatively high hydraulic pressure and corresponding large fractions of proppants to keep the aperture open. This will in turn induce pressure in parts of the rock body located above and below the fracture plane. As the pressure increases, parts of the rock body will be displaced upwards and downwards. The vertical upward and downward displacement will be approximately constant at the fractured plane during hydraulic pressure and also when proppants has been applied duly and results in stress field T that mainly progress in vertical direction and that varies with vertical distance from fractured plane and distance from primary borehole axis. A horizontal fractured plane result in almost no horizontal stress fields. The stress field and displacement will have a maximum value above the centre of the primary borehole and decreases with the distance from this borehole and be zero approximately at the fractured plane outer rim. At larger depths this effect is partially counteracted by the weight of the rock body above the fracture plane. At ground level, the effects of an induced displacement caused by hydraulic fracturing is cumulative and is increasing with the number of fracture planes, the aperture sizes, and the fractured plane area. The displacement is on the other hand decreasing with the depth of consecutive fracture planes. The tension and displacement isocurve for one plane will be of parabolic shape according to the parabolic dashed curve T. In this context, an isocurve or isoparametric curve is a curve of constant parametric-value on the 2D-surface indicated in the cross-sectional view in FIG. 6. Hence the the parabolic curve T represents points of constant value for vertical tension in the rock body. Within the rock body a collection of points of constant value for tension would be represented by a 3D-surface termed isosurface. For reasons of clarity, FIG. 6 shows a 2D representation. In the subsequent text, the term "isocurve" will be used.

The displacement at ground level GL will be concentrated above the fractured plane but decreases rapidly with horizontal distance from the primary borehole axis at fractured plane level. Larger planes with higher apertures which will potentially cause larger displacement is situated deeper underground which limits the ground level displacement but also concentrates the displacement contribution to a relatively small area above the fractured planes.

When fracturing the lower fracture plane $P_2$ to achieve a desired aperture area, schematically indicated by the arrow $A_2$ (see FIG. 6), adjacent the primary borehole 110 the induced stress and resulting rock displacement that can beforehand be estimated and be well within limits for the borehole site and adjacent infrastructure. However, when the top fracture planes, in particular the upper fracture plane $P_1$, are fractured it is possible to control the process so that the hydraulically fracturing causes little heave above fractured planes and almost no heave adjacent to, some distance from fractured plane axis.

When fracturing the upper fracture plane $P_1$ the depth of the fracture plane, its surface area and aperture are considered to avoid heave at ground level GL. The inventive concept involves a gradual reduction of the surface area of consecutive fracture planes between the bottom and the top of the storage volume. Consequently, the upper fracture plane $P_1$ will have the smallest surface area and a corresponding relatively small aperture area, schematically indicated by the arrow $A_1$, adjacent the primary borehole 110. This will in turn also require a relatively low hydraulic pressure during fracturing. By selecting suitable values for the above parameters, it is possible to maintain the level of displacement at ground level above the fractured planes below a maximum limit near the drilling site. The selection of suitable parameters will also result in a rapidly decreasing displacement with increasing horizontal distance from the fractured planes.

In FIG. 6, the rock displacement caused by induced stress/displacement during hydraulic fracturing of the upper fracture planes is indicated by the dashed parabolic line T (indicating constant stress/displacement). The line T indicates an undesirable level of displacement that should preferably not reach infrastructure above fractured planes at or near ground level. During fracturing of at least the uppermost fracture planes induced stress and rock displacement can be monitored in order to avoid or at least minimize heave to acceptable levels adjacent the drilling site at or near ground level.

FIG. 7 shows a schematic illustration of deformation in a rock body at the upper portion of the storage volume shown in FIG. 6. FIG. 7 only shows the two uppermost fracture planes $P_1$, $P_{x1}$. During fracturing of the fracture plane $P_{x1}$ some stress will be induced downwards, but this will not affect parts of the storage volume in the rock body below that plane. Stress induced in the downward direction generates a downward stress/displacement within the area indicated by the resulting stress/displacement isocurve $S_2$. Similarly, stress induced in the upward direction generates a downward stress/displacement within the area indicated by the resulting stress/displacement isocurve $S_1$. The isocurves $S_1$, $S_2$ represent resulting stress/displacement having very small numerical values that is rapidly decreasing with distance from fractured plane axis. The stress/displacement induced in these areas will cause almost no displacement at ground level. When fracturing the plane $P_{x1}$ to an aperture $A_{x1}$, the increased stress level concentrated in an area above the fracture plane is sufficient to cause an upward displacement of the rock body in the area delimited by the dashed line $T_{x1}$ representing an isocurve for constant vertical stress/displacement. Subsequent fracturing of the upper fracture plane $P_1$ to an aperture $A_1$ causes a further upward displacement of the rock body in the area indicated by the dashed line $T_1$, extending above the dashed line $T_{x1}$. By limiting the level of induced stress that will cause rock displacement during hydraulic fracturing, the displacement zones delimited by the lines $T_1$, $T_{x1}$ will be limited to the area around the boreholes and will decrease rapidly with increasing horizontal distance away from the boreholes. In this way, heave at ground level or displacement of underground infrastructure is kept within safe limits and have minimal or no heave at adjacent infrastructure.

FIG. 8 shows a plan view of an example of a borehole distribution at ground level for a thermal energy storage according to the invention. The example is applicable to a thermal energy storage as shown in FIG. 5A. According to this example, the thermal energy storage comprises a primary borehole 115 extending from ground level to a first predetermined depth in a rock body. A set of secondary boreholes 125a-125h are distributed in a first cluster around the primary borehole 115 and extend from ground level to the same or to individual depths in the rock body. The set of secondary boreholes 125a-125h in this example are located equidistant around the primary borehole. Alternatively, secondary boreholes are at least evenly distributed around the at least one primary borehole when permitted by local conditions.

According to an optional further example, the thermal energy storage comprises a first primary borehole 115 extending from ground level to a first predetermined depth in a rock body. A first set of secondary boreholes 125a-125h are distributed in a first cluster around the primary borehole 115 at a first distance from the primary borehole and extend from ground level to a first depth in the rock body, making up a first storage volume. A second set of secondary boreholes 124a-124h (dashed lines) are distributed in a second cluster around a second primary borehole 114, concentric with the first primary borehole 115, at a larger, second distance from the primary borehole and extend from ground level to a second depth in the rock body, making up a second storage volume. The second storage volume is located at a greater depth below ground than the first storage volume.

In the above examples, the said depths, distances and numbers of second boreholes can vary within the scope of the invention, as outlined in the above description of FIGS. 1-5. Variations in numbers and/or the distribution can be caused by a number of factors, such as geological conditions or by an active selection of the borehole position to enable a secondary borehole to reach a particular fracture plane or to avoid an undesirable rock formation.

FIG. 9 shows a perspective view of an alternative borehole distribution where boreholes are arranged in clusters. According to this alternative example, the thermal energy storage comprises a primary borehole 114 extending at an acute angle ß from ground level to a first predetermined depth in a rock body. A set of secondary boreholes 126a-126d are located in a cluster to one side the primary borehole 114 at ground level and extend from ground level to the same or to individual depths in the rock body. At ground level, the set of secondary boreholes 126a-126d in this example are located remote from a pair of complementary secondary boreholes 127a, 127b. At least an upper fracture plane $P_1$ and a lower fracture plane $P_2$ extend in a radial and/or oblique plane from the primary borehole 114 towards adjacent secondary boreholes 126a-126d. The set of secondary boreholes 126a-126d is drilled to diverge from the primary borehole 114 at least between the upper and the lower fracture planes $P_1$, $P_2$ with increasing depth. The secondary boreholes 126a-126d and the upper and lower fracture planes $P_1$, $P_2$ define a general outer boundary of a storage volume $V_6$ surrounding the at least one primary borehole 114.

The complementary secondary boreholes 127a, 127b are drilled after the initial set of secondary boreholes 126a-126d. The set of secondary boreholes 126a-126d can be located in individual positions at ground level or be located in a cluster to one side the primary borehole 114 in the same way as the initial set of complementary secondary boreholes 127a, 127b. The decision to drill additional secondary boreholes will as a rule be caused by the need to improve the flow rate between the primary and secondary boreholes through one or more fracture planes. During a subsequent drilling operation, the borehole position, drilling angle and/or depth can be selected to enable a secondary borehole to reach one or more particular fracture planes or to avoid obstacles, such as local infrastructure or an undesirable rock formation. This is illustrated in FIG. 9, where one secondary borehole 127a reaches the upper fracture plane $P_1$ and the other one secondary borehole 127b reaches both the upper and the lower fracture planes $P_1$, $P_2$.

The object of the invention is to provide a thermal energy storage in rock without the restrictions which characterise existing systems. More specifically, it is an object to bring about a large contact area between the heat carrier, such as heated/cooled water or another fluid, and the rock used as a thermal accumulator. According to the invention a characteristic of many superficial bedrocks is utilized, namely that the vertical direction, with the exception of very local deviations, coincides with the least principle stress. During hydraulic fracturing, the rock is fractured in substantially parallel fracture planes, which planes extend in predominantly or approximately in horizontal directions. The expression "predominantly or approximately in horizontal directions" should be understood to mean that the general direction over a large area is mainly horizontal, but that moderate inclinations can occur. In most cases, sufficiently large areas can be found in rock bodies wherein the inclinations of the main fractures do not exceed 30° to the horizontal plane. The above conditions apply down to a depth of approximately 300 meters.

At considerably deeper levels of rock, below 300 meters, the vertical principle stress is normally higher than any of the horizontal principle stresses, which during fracturing results in predominantly steep fracture patterns.

In sedimentary types of rock, however, the stress direction is strongly influenced by the layering foliation of the rock, a plane of weakness. This has long been utilized in drilling for oil and in this field a well-developed technique has been worked out for the hydraulic fracturing of deep layers of rock. By applying and regulating the pressure in view of the local conditions, the horizontal or approximately horizontal cracks can be caused to propagate over considerable distances. In the invention, this experience and technical achievements can be utilized to provide a store for heat storage in rock. Preferably, the rock should be igneous or metamorphic and as homogeneous as possible, for example a granite.

The region in which the store is to be placed should also have a low hydraulic gradient. This can be determined by flow tests carried out at the very beginning of the storage construction, before the fracturing of the rock is performed.

According to the invention, the rock is fractured at different levels from one or more production boreholes by applying hydraulic excess pressure at said levels so that a storage volume is obtained comprising a number of approximately plane parallel fractures, the directions of propagation of which are determined by the natural stress state of the rock. Through the hydraulic fracturing, there is the possibility of placing the approximately plane parallel fractures selectively to a great extent at desired levels below ground and with the desired division or spacing between planes. The division is determined by a number of factors such as the heat-conducting capacity of the rock, the temperature of the water to be supplied, the charging time etc. Preferably, however, the fracture planes are placed with a division amounting to between 2 and 10 meters. A thermal energy storage can comprise more than one storage volume, which volume can be arranged side-by-side or consecutively, in series at increasing depths.

The number and/or extension of the fracture planes is determined according to the desired storage capacity of the thermal energy storage. As a rule, geological or other technical conditions do not cause any problems as far as the achievement of the desired fracture plane areas is concerned. According to the demands in different cases the horizontal fractures may have a radial extension up to 100 metres or more around each production borehole. The individual fracture planes can have an area extension between 150 and 10 000 m². Also, the depth below the surface of the ground may be varied as well as the number of fracture planes. The number of fracture planes is chosen to provide a total surface area for the thermal energy storage that at least equals the desired storage capacity. According to the invention, the depth below ground level should be at least 25 meters and down to about 300 meters, depending on local conditions.

At least one production hole is drilled down to the bottom of an associated storage volume. The at least one production hole is connected to a number of infiltration holes by fracture or fissure planes to permit communication between the infiltration holes and the at least one production hole at different levels. The mainly parallel fissure or fracture planes may to a certain extent consist of natural cracks or of cracks which spontaneously are formed when the horizontal or approximately horizontal fracture planes are established. The fracture planes can be established by applying hydraulic pressure to a production borehole at selected, suitable levels below ground level.

Through geological exploration, the hydraulic pressure can be applied at the levels which are most favourable from the point of view of the stress pattern in the rock body. The pressure is applied in specifically selected sections of the borehole. For example, the selected section of the production borehole is sealed off above and below the section by sealing sleeves, after which an elevated, controllable hydraulic pressure is applied between the sealing sleeves. Alternatively, the pressure can be applied in a bottom section of a borehole so that the rock is split up starting from this section of the borehole. After that, the hole can be drilled further down, after which the new bottom section is exposed to the hydraulic excess pressure and so on. In one of these ways or by other means which are based on controlled hydraulic fracturing, the mainly plane parallel fracture planes can be caused to extend over large areas, preferably so that the fracture planes extend over the whole width of the store. The number, depth and angle of the infiltration holes is adapted to the required volume of the store, the stress pattern in the rock and the desired flow rate between the infiltration holes and the at least one production hole. More infiltration holes can be drilled if required to achieve a desired flow rate towards the at least one production hole and/or to reach a particular fracture plane.

In order to increase the permeability of fractures and in particular to prevent the fissures and cracks from closing again as a result of the fact that the rock expands when the hot water filters in, it is advisable to inject hard particles into the system under pressure. For example, they can be injected together with the hydraulic fluid in connection with the fracturing. Spacing particles such as quartz are suitable in this connection. To make the introduction of the spacing particles into the fissures and cracks more effective, different fractions of the particles can be introduced together with a lubricant or other substance with similar properties. A number of infiltration holes are drilled about the at least one production borehole before or after the rock has been fractured. If the store has a moderately large volume only one production borehole is drilled which is placed in the centre. With larger stores, a plurality of production holes may be required. The at least one production borehole is used as a pump hole for discharging fluid during operation of the storage.

When charging of a rock body prepared in the above manner, a heat carrier such as hot water is infiltrated into the cracked storage via infiltration, or secondary holes during a charging phase. At the same time, relatively colder water is drawn off from the storage through the at least one production hole. Through the relatively fine-mesh network of horizontal or approximately horizontal fissures which have been fractured in the rock body, an effective heat charging of the rock can be brought about with high utilization of the energy content of the hot water. The hot water is normally obtained from solar collectors, wind power plants, power generating plants, excess/waste heat from industrial facilities or the like. The hot water is introduced into the storage via infiltration holes extending through the fracture planes of each storage volume associated with the at least one production hole. The flow through the storage volume can be controlled by one or more pumps in the production hole. The hot water can also be forced into the fracture planes by pressurizing the infiltration holes.

During the discharge of the store, hot water is removed by pumping in out of the production, or primary hole or holes. The hot water which is pumped out is replaced by colder water which is introduced through the infiltration holes in the same direction as the hot water during the charging phase. The discharged hot water can be used in any suitable manner, e.g. for domestic heating or for other purposes, possibly via a heat pump. The pump capacity of the production hole or production holes, the temperature of the charged hot water, the volume of the storage, the thermal capacity of the rock and its heat conducting capacity determine the capacity of the system. Using a thermal energy storage according to the invention, the hydrogeological, thermal and mechanical properties and conditions of the rock are effectively utilized.

Besides heat storage, the same storage as described above can also be used for "cold storage". In this case, the storage is cooled down by means of cold water during a charging phase, after which the storage is discharged in a similar manner to the preceding case. This modification of the thermal energy storage according to the invention can be utilized for example to provide cold water for air-conditioning systems in an economically advantageous manner.

The invention should not be deemed to be limited to the embodiments described above, but rather a number of further variants and modifications are conceivable within the scope of the following patent claims.

The invention claimed is:

1. A thermal energy storage with at least one artificial thermal energy storage volume and an additional volume of rock body surrounding the storage volume, the thermal energy storage comprising:
   at least one primary borehole extending from ground level to a first predetermined depth in a rock body;
   at least one set of secondary boreholes located in a cluster adjacent the at least one primary borehole at ground level;
   at least an upper and a lower fracture plane extending in a radial and/or oblique plane from the at least one primary borehole towards adjacent secondary boreholes, where at least one fracture plane permits a hydraulic flow between at least one of the secondary boreholes and the primary borehole;
   wherein each artificial thermal energy storage volume is defined by one set of secondary boreholes and its upper and lower fracture planes;
   wherein the set of secondary boreholes diverge away from the at least one primary borehole at each fractured plane level with increasing depth, without intersecting the at least one primary borehole; and
   wherein the surface area of consecutive fracture planes and the storage volume of the thermal energy storage are arranged to gradually increase with increasing depth, which fracture planes are connected by the secondary boreholes.

2. Thermal energy storage according to claim 1, wherein each set of secondary boreholes comprises at least two drilled holes extending from ground level to a predetermined depth in the rock body and intersecting at least one fractured plane.

3. Thermal energy storage according to claim 1, wherein the set of secondary boreholes are located equidistant around the at least one primary borehole.

4. Thermal energy storage according to claim 1, wherein the set of secondary boreholes in each thermal energy storage volume extend from ground level to the same depth or to individual depths in the rock body.

5. Thermal energy storage according to claim 1, wherein the at least one primary borehole has a greater diameter than the secondary boreholes.

6. Thermal energy storage according to claim 1, wherein the energy storage comprises multiple primary boreholes.

7. Thermal energy storage according to claim 1, wherein the secondary boreholes diverge away from the at least one primary borehole at each fractured plane level, at angles up to 45°.

8. Thermal energy storage according to claim 1, wherein each secondary borehole is arranged at an angle out of a radial plane through the least one primary borehole in order to pass to one side of the least one primary borehole between ground level and the upper fracture plane prior to diverging away from the primary borehole.

9. The thermal energy storage according to claim 1, wherein the fracture planes from the upper fracture plane to the lower fracture plane have an aperture area measured adjacent the primary borehole, wherein the cumulative aperture area of all fracture planes is distributed so that at least half the cumulative aperture area is located at or below a point half way between the upper and lower fracture planes.

10. The thermal energy storage according to claim 1, wherein the size of the fracture plane apertures increases from the upper fracture plane towards the lower fracture plane.

11. The thermal energy storage according to 1, wherein the size of each fracture plane aperture is selected based on a desired flow rate for each fracture plane.

12. The thermal energy storage according to claim 1, wherein thermal energy storage comprises at least two concentric and vertically separated thermal energy storage volumes, each volume comprising at least one primary borehole surrounded by a set of secondary boreholes located around at least one primary borehole.

13. The thermal energy storage according to claim 12, wherein the secondary boreholes diverge from the at least one primary borehole at angles that are reduced with each successive thermal energy storage volume.

14. Process for constructing a thermal energy storage with at least one thermal energy storage volume, where the process comprises the steps of:
   drilling at least one primary borehole extending from ground level to a first predetermined depth in a rock body;
   drilling at least one set of secondary boreholes located around and diverging away from the at least one primary borehole without intersecting the at least one primary borehole;
   hydraulically fracturing at least an upper and a lower fracture plane extending from the at least one primary borehole towards adjacent secondary boreholes, which fracture planes permit a hydraulic flow between the secondary boreholes and the primary borehole; which hydraulic fracturing step is performed before or after the drilling of secondary boreholes;
   wherein the surface area of consecutive fracture planes and the storage volume of the thermal energy storage are arranged to gradually increase with increasing depth, which fracture planes are connected by the secondary boreholes; and wherein each thermal energy storage volume is defined by one set of secondary boreholes and its upper and lower fracture planes.

15. Process according to claim 14, wherein the set of secondary boreholes in a thermal energy storage volume extend from ground level to the same depth or to individual depths in the rock body.

16. Process according to claim 14, wherein the secondary boreholes diverge away from the at least one primary borehole at each fractured plane level, at angles up to 45°.

17. Process according to claim 14, wherein each secondary borehole is drilled at an angle out of a radial plane through the least one primary borehole in order to pass to one side of the least one primary borehole between ground level and the upper fracture plane prior to diverging away from the primary borehole.

18. A process according to claim 14, wherein the process further involves hydraulically fracturing fracture planes so that the fracture planes from the upper fracture plane to the lower fracture plane have an aperture area measured adjacent the primary borehole, wherein the cumulative aperture area of all fracture planes is distributed so that at least half the cumulative aperture area is located at or below a point half way between the upper and lower fracture planes.

19. The process according to claim 14, wherein the process further involves hydraulically fracturing fracture planes so that the size of the fracture plane apertures increases from the upper fracture plane towards the lower fracture plane.

20. The process according to claim 14, wherein the process further involves hydraulically fracturing fracture planes extending in a radial and/or oblique plane from the at least one primary borehole.

* * * * *